(12) United States Patent
Jain et al.

(10) Patent No.: US 11,789,830 B2
(45) Date of Patent: Oct. 17, 2023

(54) ANTI-ENTROPY-BASED METADATA RECOVERY IN A STRONGLY CONSISTENT DISTRIBUTED DATA STORAGE SYSTEM

(71) Applicant: Commvault Systems, Inc., Tinton Falls, NJ (US)

(72) Inventors: Deepak Jain, Delhi (IN); Lásaro Camargos, Uberlandia (BR); Srinivas Lakshman, San Jose, CA (US); Avinash Lakshman, Fremont, CA (US)

(73) Assignee: Commvault Systems, Inc., Tinton Falls, NJ (US)

( * ) Notice: Subject to any disclaimer, the term of this patent is extended or adjusted under 35 U.S.C. 154(b) by 121 days.

(21) Appl. No.: 17/465,722

(22) Filed: Sep. 2, 2021

(65) Prior Publication Data
US 2022/0100618 A1    Mar. 31, 2022

Related U.S. Application Data

(60) Provisional application No. 63/081,503, filed on Sep. 22, 2020.

(51) Int. Cl.
*G06F 11/20* (2006.01)
*G06F 11/14* (2006.01)

(52) U.S. Cl.
CPC ...... *G06F 11/2058* (2013.01); *G06F 11/1435* (2013.01); *G06F 11/1464* (2013.01); *G06F 11/1469* (2013.01); *G06F 11/2082* (2013.01)

(58) Field of Classification Search
CPC ............. G06F 11/1435; G06F 11/1464; G06F 11/1469; G06F 11/2058; G06F 11/2082; G06F 3/0619; G06F 3/067
See application file for complete search history.

(56) References Cited

U.S. PATENT DOCUMENTS

| 4,084,231 A | 4/1978 | Capozzi et al. |
| 4,267,568 A | 5/1981 | Dechant et al. |
| (Continued) | | |

FOREIGN PATENT DOCUMENTS

| EP | 0259912 | 3/1988 |
| EP | 0405926 | 1/1991 |
| (Continued) | | |

OTHER PUBLICATIONS

J. Zhou, Y. Chen, W. Wang, S. He and D. Meng, "A Highly Reliable Metadata Service for Large-Scale Distributed File Systems," in IEEE Transactions on Parallel and Distributed Systems, vol. 31, No. 2, pp. 374-392, Feb. 1, 2020, doi: 10.1109/TPDS.2019.2937492. (Year: 2020).*

(Continued)

*Primary Examiner* — Bryce P Bonzo
*Assistant Examiner* — Albert Li
(74) *Attorney, Agent, or Firm* — Commvault Systems, Inc.

(57) ABSTRACT

A strongly consistent distributed data storage system comprises an enhanced metadata service that is capable of fully recovering all metadata that goes missing when a metadata-carrying disk, disks, and/or partition fail. An illustrative recovery service runs automatically or on demand to bring the metadata node back into full service. Advantages of the recovery service include guaranteed full recovery of all missing metadata, including metadata still residing in commit logs, without impacting strong consistency guarantees of the metadata. The recovery service is network-traffic efficient. In preferred embodiments, the recovery service avoids metadata service downtime at the metadata node, thereby reducing the impact of metadata disk failure on the availability of the system. The disclosed metadata recovery techniques are said to be "self-healing" as they do not need (Continued)

manual intervention and instead automatically detect failures and automatically recover from the failures in a non-disruptive manner.

20 Claims, 17 Drawing Sheets

(56) References Cited

U.S. PATENT DOCUMENTS

| | | |
|---|---|---|
| 4,283,787 A | 8/1981 | Chambers |
| 4,417,321 A | 11/1983 | Chang et al. |
| 4,641,274 A | 2/1987 | Swank |
| 4,654,819 A | 3/1987 | Stiffler et al. |
| 4,686,620 A | 8/1987 | Ng |
| 4,912,637 A | 3/1990 | Sheedy et al. |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,301,286 A | 4/1994 | Rajani |
| 5,321,816 A | 6/1994 | Rogan et al. |
| 5,347,653 A | 9/1994 | Flynn et al. |
| 5,410,700 A | 4/1995 | Fecteau et al. |
| 5,420,996 A | 5/1995 | Aoyagi |
| 5,454,099 A | 9/1995 | Myers et al. |
| 5,559,991 A | 9/1996 | Kanfi |
| 5,642,496 A | 6/1997 | Kanfi |
| 6,418,478 B1 | 7/2002 | Ignatius et al. |
| 6,542,972 B2 | 4/2003 | Ignatius et al. |
| 6,658,436 B2 | 12/2003 | Oshinsky et al. |
| 6,721,767 B2 | 4/2004 | De Meno et al. |
| 6,760,723 B2 | 7/2004 | Oshinsky et al. |
| 7,003,641 B2 | 2/2006 | Prahlad et al. |
| 7,035,880 B1 | 4/2006 | Crescenti et al. |
| 7,107,298 B2 | 9/2006 | Prahlad et al. |
| 7,130,970 B2 | 10/2006 | Devassy et al. |
| 7,162,496 B2 | 1/2007 | Amarendran et al. |
| 7,174,433 B2 | 2/2007 | Kottomtharayil et al. |
| 7,246,207 B2 | 7/2007 | Kottomtharayil et al. |
| 7,315,923 B2 | 1/2008 | Retnamma et al. |
| 7,343,453 B2 | 3/2008 | Prahlad et al. |
| 7,389,311 B1 | 6/2008 | Crescenti et al. |
| 7,395,282 B1 | 7/2008 | Crescenti et al. |
| 7,440,982 B2 | 10/2008 | Lu et al. |
| 7,454,569 B2 | 11/2008 | Kavuri et al. |
| 7,490,207 B2 | 2/2009 | Amarendran et al. |
| 7,500,053 B1 | 3/2009 | Kavuri et al. |
| 7,529,782 B2 | 5/2009 | Prahlad et al. |
| 7,536,291 B1 | 5/2009 | Vijayan Retnamma et al. |
| 7,543,125 B2 | 6/2009 | Gokhale |
| 7,546,324 B2 | 6/2009 | Prahlad et al. |
| 7,603,386 B2 | 10/2009 | Amarendran et al. |
| 7,606,844 B2 | 10/2009 | Kottomtharayil |
| 7,613,752 B2 | 11/2009 | Prahlad et al. |
| 7,617,253 B2 | 11/2009 | Prahlad et al. |
| 7,617,262 B2 | 11/2009 | Prahlad et al. |
| 7,620,710 B2 | 11/2009 | Kottomtharayil et al. |
| 7,636,743 B2 | 12/2009 | Erofeev |
| 7,651,593 B2 | 1/2010 | Prahlad et al. |
| 7,657,550 B2 | 2/2010 | Prahlad et al. |
| 7,660,807 B2 | 2/2010 | Prahlad et al. |
| 7,661,028 B2 | 2/2010 | Erofeev |
| 7,734,669 B2 | 6/2010 | Kottomtharayil et al. |
| 7,747,579 B2 | 6/2010 | Prahlad et al. |
| 7,801,864 B2 | 9/2010 | Prahlad et al. |
| 7,809,914 B2 | 10/2010 | Kottomtharayil et al. |
| 8,170,995 B2 | 5/2012 | Prahlad et al. |
| 8,229,954 B2 | 7/2012 | Kottomtharayil et al. |
| 8,285,681 B2 | 10/2012 | Prahlad et al. |
| 8,307,177 B2 | 11/2012 | Prahlad et al. |
| 8,364,652 B2 | 1/2013 | Vijayan et al. |
| 8,370,542 B2 | 2/2013 | Lu et al. |
| 8,578,120 B2 | 11/2013 | Attarde et al. |
| 8,612,439 B2 | 12/2013 | Prahlad et al. |
| 8,706,867 B2 | 4/2014 | Vijayan |
| 8,950,009 B2 | 2/2015 | Vijayan et al. |
| 8,954,446 B2 | 2/2015 | Vijayan Retnamma et al. |
| 9,020,900 B2 | 4/2015 | Vijayan Retnamma et al. |
| 9,021,282 B2 | 4/2015 | Muller |
| 9,098,495 B2 | 8/2015 | Gokhale |
| 9,116,633 B2 | 8/2015 | Sancheti et al. |
| 9,189,170 B2 | 11/2015 | Harakhchand et al. |
| 9,239,687 B2 | 1/2016 | Vijayan et al. |
| 9,262,496 B2 | 2/2016 | Kumarasamy et al. |
| 9,286,110 B2 | 3/2016 | Mitkar et al. |
| 9,311,121 B2 | 4/2016 | Deshpande et al. |
| 9,378,035 B2 | 6/2016 | Kripalani |
| 9,411,534 B2 | 8/2016 | Lakshman et al. |
| 9,424,151 B2 | 8/2016 | Lakshman et al. |
| 9,451,023 B2 | 9/2016 | Sancheti et al. |
| 9,461,881 B2 | 10/2016 | Kumarasamy et al. |
| 9,483,205 B2 | 11/2016 | Lakshman et al. |
| 9,495,404 B2 | 11/2016 | Kumarasamy et al. |
| 9,558,085 B2 | 1/2017 | Lakshman et al. |
| 9,633,033 B2 | 4/2017 | Vijayan et al. |
| 9,639,274 B2 | 5/2017 | Maranna et al. |
| 9,641,388 B2 | 5/2017 | Kripalani et al. |
| 9,710,465 B2 | 7/2017 | Dornemann et al. |
| 9,798,489 B2 | 10/2017 | Lakshman et al. |
| 9,864,530 B2 | 1/2018 | Lakshman |
| 9,875,063 B2 | 1/2018 | Lakshman |
| 9,983,936 B2 | 5/2018 | Dornemann et al. |
| 10,067,722 B2 | 9/2018 | Lakshman |
| 10,084,873 B2 | 9/2018 | Dornemann |
| 10,162,528 B2 | 12/2018 | Sancheti et al. |
| 10,210,048 B2 | 2/2019 | Sancheti |
| 10,228,962 B2 | 3/2019 | Dornemann et al. |
| 10,248,174 B2 | 4/2019 | Lakshman et al. |
| 10,296,368 B2 | 5/2019 | Dornemann et al. |
| 10,346,259 B2 | 7/2019 | Gokhale et al. |
| 10,417,102 B2 | 9/2019 | Sanakkayala et al. |
| 10,592,350 B2 | 3/2020 | Dornemann |
| 10,776,329 B2 | 3/2020 | Polimera et al. |
| 10,664,352 B2 | 5/2020 | Rana |
| 10,678,758 B2 | 6/2020 | Dornemann |
| 10,691,187 B2 | 6/2020 | Lakshman |
| 10,740,193 B2 | 8/2020 | Dhatrak |
| 10,740,300 B1 | 8/2020 | Lakshman et al. |
| 10,747,630 B2 | 8/2020 | Sanakkayala et al. |
| 10,768,971 B2 | 9/2020 | Dornemann et al. |
| 10,776,209 B2 | 9/2020 | Pawar et al. |
| 10,795,577 B2 | 10/2020 | Lakshman et al. |
| 10,846,024 B2 | 11/2020 | Lakshman et al. |
| 10,848,468 B1 | 11/2020 | Lakshman et al. |
| 10,853,195 B2 | 12/2020 | Ashraf et al. |
| 10,877,928 B2 | 12/2020 | Nagrale et al. |
| 10,891,198 B2 | 1/2021 | Nara et al. |
| 10,949,308 B2 | 3/2021 | Krishnan |
| 11,099,956 B1 | 8/2021 | Polimera et al. |
| 11,106,632 B2 | 8/2021 | Bangalore et al. |
| 11,113,246 B2 | 9/2021 | Mitkar et al. |
| 2006/0224846 A1 | 10/2006 | Amarendran et al. |
| 2009/0319534 A1 | 12/2009 | Gokhale |
| 2012/0150818 A1 | 6/2012 | Vijayan Retnamma et al. |
| 2012/0150826 A1 | 6/2012 | Vijayan Retnamma et al. |
| 2014/0052706 A1* | 2/2014 | Misra .......... G06F 16/1837 707/698 |
| 2014/0196038 A1 | 7/2014 | Kottomtharayil et al. |
| 2014/0201140 A1 | 7/2014 | Vibhor et al. |
| 2014/0201157 A1 | 7/2014 | Pawar et al. |
| 2014/0201170 A1 | 7/2014 | Vijayan et al. |
| 2015/0074536 A1 | 3/2015 | Varadharajan et al. |
| 2016/0142485 A1 | 5/2016 | Mitkar et al. |
| 2016/0350302 A1 | 12/2016 | Lakshman |
| 2016/0350391 A1 | 12/2016 | Vijayan et al. |

(56) References Cited

U.S. PATENT DOCUMENTS

| | | |
|---|---|---|
| 2017/0168903 A1 | 6/2017 | Dornemann et al. |
| 2017/0185488 A1 | 6/2017 | Kumarasamy et al. |
| 2017/0192866 A1 | 7/2017 | Vijayan et al. |
| 2017/0193003 A1 | 7/2017 | Vijayan et al. |
| 2017/0235647 A1 | 8/2017 | Kilaru et al. |
| 2017/0242871 A1 | 8/2017 | Kilaru et al. |
| 2018/0276085 A1 | 9/2018 | Mitkar et al. |
| 2018/0285202 A1 | 10/2018 | Bhagi |
| 2018/0285205 A1 | 10/2018 | Mehta et al. |
| 2018/0285383 A1 | 10/2018 | Nara et al. |
| 2019/0050421 A1* | 2/2019 | Saxena .............. G06F 11/1469 |
| 2020/0073574 A1 | 3/2020 | Pradhan |
| 2020/0233845 A1 | 7/2020 | Dornemann et al. |
| 2020/0241613 A1 | 7/2020 | Lakshman et al. |
| 2020/0250041 A1* | 8/2020 | Wan .................... G06F 11/1435 |
| 2020/0278915 A1 | 9/2020 | Degaonkar et al. |
| 2020/0319694 A1 | 10/2020 | Mohanty et al. |
| 2020/0341871 A1* | 10/2020 | Shveidel ............. G06F 11/2064 |
| 2020/0349027 A1 | 11/2020 | Bansod et al. |
| 2020/0394110 A1 | 12/2020 | Ramohalli Gopala Rao et al. |
| 2020/0401489 A1 | 12/2020 | Mitkar et al. |
| 2021/0034468 A1* | 2/2021 | Patel ....................... G06F 3/067 |
| 2021/0049079 A1 | 2/2021 | Kumar et al. |
| 2021/0064484 A1 | 3/2021 | Dornemann et al. |
| 2021/0075768 A1 | 3/2021 | Polimera et al. |
| 2021/0089215 A1 | 3/2021 | Ashraf et al. |
| 2021/0173744 A1 | 6/2021 | Agrawal et al. |
| 2021/0200648 A1* | 7/2021 | Clark .................. G06F 11/1448 |
| 2021/0209060 A1 | 7/2021 | Kottomtharayil et al. |
| 2021/0218636 A1 | 7/2021 | Parvathmvenkatas et al. |
| 2021/0255771 A1 | 8/2021 | Kilaru et al. |
| 2021/0271564 A1 | 9/2021 | Mitkar et al. |
| 2021/0286639 A1 | 9/2021 | Kumar |
| 2021/0357246 A1 | 11/2021 | Kumar et al. |

FOREIGN PATENT DOCUMENTS

| | | |
|---|---|---|
| EP | 0467546 | 1/1992 |
| EP | 0541281 | 5/1993 |
| EP | 0774715 | 5/1997 |
| EP | 0809184 | 11/1997 |
| EP | 0899662 | 3/1999 |
| EP | 0981090 | 2/2000 |
| WO | WO 95/13580 | 5/1995 |
| WO | WO 99/12098 | 3/1999 |
| WO | WO 2006/052872 | 5/2006 |
| WO | WO2016/004120 | 1/2016 |

OTHER PUBLICATIONS

U.S. Appl. No. 16/907,023, filed Jun. 19, 2020, Owen et al.
U.S. Appl. No. 17/120,555, filed Dec. 14, 2020, Chatterjee et al.
U.S. Appl. No. 17/153,667, filed Jan. 20, 2021, Naik et al.
U.S. Appl. No. 17/153,674, filed Jan. 20, 2021, Lakshman.
U.S. Appl. No. 17/165,266, filed Feb. 2, 2021, Nara et al.
U.S. Appl. No. 17/179,160, filed Feb. 18, 2021, Kavaipatti Anantharamakrishnan.
U.S. Appl. No. 17/336,103, filed Jun. 1, 2021, Vastrad et al.
U.S. Appl. No. 17/354,905, filed Jun. 22, 2021, Rana et al.
U.S. Appl. No. 17/389,204, filed Jul. 29, 2021, Mahajan et al.
U.S. Appl. No. 17/465,683, filed Sep. 2, 2021, Carmagos.
U.S. Appl. No. 17/465,691, filed Sep. 2, 2021, Carmagos.
U.S. Appl. No. 17/494,702, filed Oct. 5, 2021, Polimera et al.
U.S. Appl. No. 17/501,881, filed Oct. 14, 2021, Dornemann et al.
U.S. Appl. No. 17/508,822, filed Oct. 22, 2021, Mutha et al.
U.S. Appl. No. 17/526,927, filed Nov. 15, 2021, Kapadia et al.
Seto, Christ, "Why Deploying on Kubernetes is Like Flying With an Alligator," Cockroach Labs (https://www.cockroachlabs.com/blog/kubernetes-scheduler/), dated Feb. 9, 2021, retrieved on Mar. 8, 2021, in 8 pages.
Arneson, "Mass Storage Archiving in Network Environments" IEEE, Oct. 31-Nov. 1998, pp. 45-50.
Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.
Eitel, "Backup and Storage Management in Distributed Heterogeneous Environments," IEEE, 1994, pp. 124-126.
Huff, KL, "Data Set Usage Sequence Number," IBM Technical Disclosure Bulletin, vol. 24, No. 5, Oct. 1981 New York, US, pp. 2404-2406.
Rosenblum et al., "The Design and Implementation of a Log-Structure File System," Operating Systems Review SIGOPS, vol. 25, No. 5, May 1991, New York, US, pp. 1-15.
Lakshman et al., "Cassandra—A Decentralized Structured Storage System", https://doi.org/10.1145/1773912.1773922, ACM SIGOPS Operating Systems Review, Volum 44, Issue 2, Apr. 2010, pp. 35-40.
Swiftstack, Inc., The OpenStack Object Storage System, Feb. 2012, pp. 1-29.

* cited by examiner

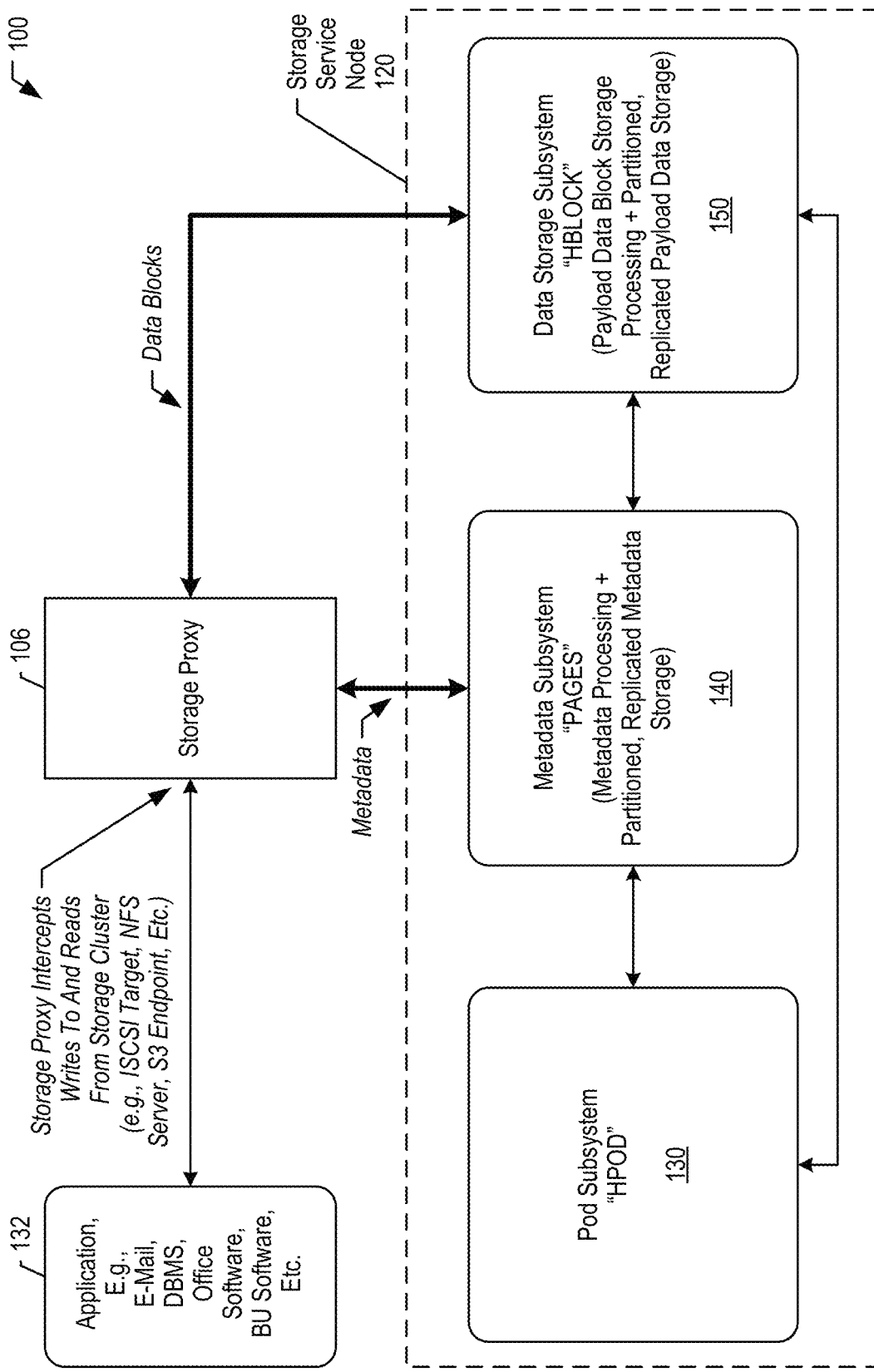
FIG. 1C  Illustrative Storage Service Node Comprising Pod Synchronization Subsys., Metadata Subsys., And Data Storage Subsys.

Coverage Map 303

| Key | Value |
|---|---|
| Replica_1 – Table – Column Family X | Range Values |
| Replica_2 – Table – Column Family X | Range Values |
| Replica_1 – Table – Column Family Y | Range Values |

ANTI-ENTROPY-BASED METADATA RECOVERY IN A STRONGLY CONSISTENT DISTRIBUTED DATA STORAGE SYSTEM

INCORPORATION BY REFERENCE TO ANY PRIORITY APPLICATIONS

This application claims the benefit of priority to the following U.S. Provisional applications: U.S. Provisional App. 63/081,503 filed on Sep. 22, 2020 with the title of "Anti-Entropy-Based Metadata Recovery In A Strongly Consistent Distributed Data Storage System." Any and all applications for which a foreign or domestic priority claim is identified in the Application Data Sheet of the present application are hereby incorporated by reference in their entireties under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND

Distributed data storage systems require close tracking of data stored on multiple nodes, and therefore require metadata that can be counted on for integrity and fault-tolerance. When metadata-carrying infrastructure fails (e.g., disks, partitions, and/or entire nodes go out of service), the data availability and/or operational performance of the entire data storage platform can be at risk. For example, in the case of payload data, when data-carrying disks/nodes fail, metadata helps find and recover the lost data from other data sources on the storage system. However, failed metadata-carrying disks/nodes jeopardize the health of the entire storage system, risking data loss and data unavailability. Restarting the system after a metadata disk/node failure works as a brute force solution, but is highly undesirable, because it takes the storage platform out of service. Therefore, there is a need for a streamlined approach for recovering metadata disks in a distributed data storage system that does not take the system out of service and does not impact the strong consistency guarantees of the system's metadata.

SUMMARY

The present inventors devised a technological solution that recovers metadata when metadata-carrying disks, partitions, and/or nodes fail in a strongly consistent distributed data storage system. The disclosed metadata recovery techniques recover all lost metadata without impacting strong consistency guarantees of the metadata and without system downtime or restart, thereby improving the availability of the system. The disclosed techniques also recover metadata on commit logs, which is where incoming data blocks reside temporarily before being persisted to local storage. In preferred embodiments, a replacement storage resource for storing metadata retains the same system-wide identifier ("disk ID") as the failed storage resource, which advantageously allows metadata services to continue operating without restart.

To enhance the reader's understanding of the present disclosure, the term "metadata" is distinguished herein from the term "data." Accordingly, "data" will refer to "payload" data, which is typically generated by an application or other data source that uses the distributed data storage system for data storage. Thus, the terms "data", "payload", and "payload data" will be used interchangeably herein. On the other hand, "metadata" will refer to other information in the distributed data storage system, e.g., information about the payload data, about the components hosting the payload data, about metadata-hosting components, about other components of the distributed data storage system, and also information about the metadata, i.e., "meta-metadata."

The illustrative distributed data storage system comprises a plurality of storage service nodes. Each storage service node is typically configured with a number of hardware storage resources, e.g., hard disk drives (HDD), solid state storage drives (SSD) such as flash memory technology, etc. The system stores payload data on certain dedicated storage resources managed by a so-called "data storage subsystem", and stores metadata on other dedicated storage resources managed by a so-called "metadata subsystem". Thus, another way to distinguish payload data from metadata in the illustrative system is that payload data is in the data storage subsystem and metadata is in the metadata subsystem. The illustrative system uses commit logs, which are preferably stored on solid state storage drives (SSD) before they are flushed to local hard disk drives (HDD). Metadata commit logs are stored on dedicated metadata-commit-log drives, whereas payload-data commit logs are stored on distinct dedicated data-commit-log drives. An illustrative synchronization subsystem maintains certain system-level information, and is known as the "pod subsystem". The pod subsystem, the metadata subsystem, and the data storage subsystem are all partitioned and replicated across various storage service nodes. The system ensures strong consistency of data written by applications.

The metadata subsystem executing on a storage service node stores metadata on one or more SSD/HDD drives (hereinafter "disks" or "storage resources" unless otherwise noted) at the storage service node. The metadata subsystem at the storage service node communicates with the metadata subsystem on one or more other storage service nodes to provide a system-wide metadata service. The metadata subsystem also communicates with pod and/or data storage subsystems at the same or other storage service nodes. A metadata subsystem executing on a storage service node is sometimes referred to herein as a "metadata node" that provides "metadata service."

Generally, the present solution causes no system-wide downtime because the system-wide metadata service provided by the network of metadata nodes remains active even when individual metadata disks are down. Furthermore, the present solution also causes no downtime in metadata service at the individual storage service node that includes the failed metadata-carrying disk, disks, and/or disk partitions.

A number of key distinctions to prior-art data recovery techniques are worth noting. Here, the disclosed techniques are applied to metadata infrastructure not to payload data infrastructure. Prior-art payload data recovery is based on and made possible by a robust and working metadata service, whereas here the metadata service itself is at risk. Prior-art payload data recovery is typically based on replacing a failed data storage disk with a disk having a new disk ID, in a so-called "storage pool migration" process. In contrast, here, the preferred embodiments retain the metadata disk ID and logically rehabilitate the disk ID after the failure, which enables the metadata service to continue operating without restart. Migration to a new metadata disk ID is also possible, in which case the metadata service needs to be restarted after metadata is recovered to the new disk ID. The prior-art payload data recovery techniques use the metadata service to find replicas of lost data on one or more other data storage nodes and payload data files are streamed therefrom to the new disk. However, payload data in commit logs (i.e., before being persisted to ordinary data storage disks) cannot be recovered in this way, which could lead to loss of payload data. Therefore, these prior-art techniques are unsuitable for metadata recovery. In contrast, the present solution recovers metadata lost on metadata-commit-log disks as well as on ordinary metadata service disks. Furthermore, the present solution does not rely on "blind" streaming of data files from other nodes and instead employs techniques to minimize network traffic among nodes.

Further, the present solution is technology-aware and ensures that metadata lost from a certain kind of storage technology (e.g., SSD) is recovered to the same type of technology. Because SSD is preferentially used for fast-access storage such as commit logs and certain metadata (e.g., deduplication hash tables, etc.), the present solution enforces a device-technology recovery policy for failed metadata-carrying disks. Policy enforcement like this is not currently featured in prior-art payload data recovery (i.e., migration) techniques, at least in part because a new disk ID can be differently configured when inserted into the storage cluster. Finally, the present solution intelligently recovers from a variety of metadata failures, including whole-disk failures, disk partition failures, and multi-disk failures. Partition failure handling is particularly useful for data storage appliances that have fewer disks and are differently organized than other expandable distributed data storage systems. In sum, there are numerous technological distinctions between prior-art payload data recovery techniques and the present approach to recovery of metadata-hosting disks.

The illustrative solution comprises a number of interoperating processes that run at each metadata node. One of the key processes, the so-called fixdisk( ) process, runs on the storage service node that detects a failure in one of the metadata disks, e.g., metadata-commit-log disk, ordinary metadata service disk. An operating system watchdog process detects the disk failure and upon so doing, calls a so-called faildisk( ) process. The faildisk( ) process causes the metadata disk to be taken out of service temporarily while metadata is recovered. After replacement, the metadata disk is remounted preferably with the same disk ID as its predecessor failed disk. Now fixdisk( ) takes charge of the recovery and rehabilitation process at the metadata node. Fixdisk( ) first determines which metadata files are assigned to the failed disk ID by the system-wide metadata partitioning scheme, which employs strong consistency. The present metadata node determines the identity of other metadata nodes that comprise whole or partial replicas of the metadata stored at the present metadata node and/or failed metadata disk. Fixdisk( ) fetches from the replica nodes indexes that indicate which metadata files are stored at those replica nodes. These metadata files carry numerical identifiers in certain ranges, which may be referred to as file ranges. Fixdisk( ) determines which ranges it needs to retrieve from which replica nodes and initiates retrieval calls thereto. It should be noted that fixdisk( ) may determine that it already has some of the needed file ranges and it saves network bandwidth and processing cycles by not requesting these file ranges. Fixdisk( ) maintains a dynamic "coverage map," checking off received files and tracking which file ranges still need to be received from replica nodes. Once the "coverage map" has been exhausted, i.e., all the identified file ranges are stored at the recovering metadata node, fixdisk( ) proceeds to integrate the files into "in-service" data structures. This may necessitate merging, renaming, and/or adding these files to other existing metadata, if any, on the metadata node. Once the integration step is complete, metadata input/output ("I/O") to/from the disk is now possible. To complete the healing process, fixdisk( ) communicates with the pod synchronization subsystem to remove indications that the metadata disk is out of service. With the out-of-service indication being removed from the pod synchronization subsystem, fixdisk( ) has successfully completed the metadata recovery and metadata service resumes full operation.

Fixdisk( ) will abort if it receives notice that other metadata disks have failed in the storage service node or if the storage cluster is changing (e.g., new nodes are being added). In such a case, fixdisk( ) will try again later after the failed disks have been replaced and/or new nodes have been added, respectively. In some scenarios, fixdisk( ) proceeds to recover metadata even if a failed disk has not been physically replaced. This approach provides a partial solution that enables some metadata services to proceed, albeit in a somewhat degraded fashion.

The disclosed metadata recovery techniques are said to be "self-healing" as they do not need manual intervention and instead automatically detect failures and automatically recover from the failures in a non-disruptive manner. The metadata subsystem at one node recovers lost metadata from other metadata nodes within the system-wide metadata service. In contrast, payload data recovery must go outside the data storage subsystem to obtain information from the metadata subsystem. The illustrative solution can be applied to any number of failed metadata-carrying disks (SDD, HDD, etc.) in a storage service node. More details are given below and in the accompanying figures.

BRIEF DESCRIPTION OF THE DRAWINGS

FIG. 1C is a block diagram depicting certain subsystems of the storage service of distributed data storage system 100, according to an illustrative embodiment.

FIG. 3B is a block diagram that depicts an illustrative coverage map 303.

DETAILED DESCRIPTION

Figure 1A:
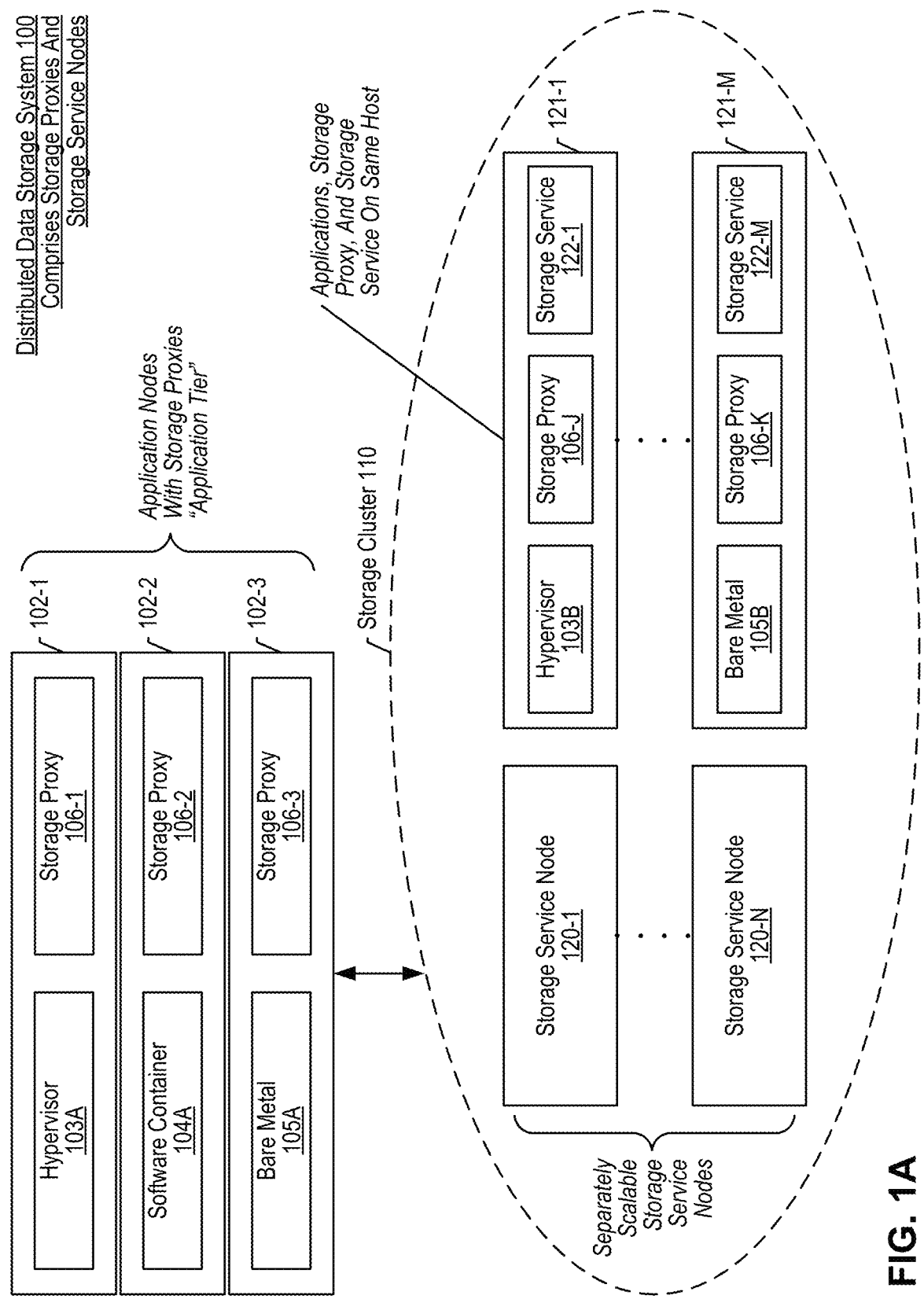
FIG. 1A is a block diagram depicting a distributed data storage system 100 according to an illustrative embodiment.

Detailed descriptions and examples of systems and methods according to one or more illustrative embodiments may be found herein as well as in the section entitled Example Embodiments, and also in FIGS. 1A-7. Various embodiments described herein are intimately tied to, enabled by, and would not exist except for, computer technology. For example, storing and retrieving metadata to/from various storage nodes, and synchronizing and maintaining data structures for metadata described herein in reference to various embodiments cannot reasonably be performed by humans alone, without the computer technology upon which they are implemented.

Generally, the systems and associated components described herein may be compatible with and/or provide at least some of the functionality of the systems and corresponding components described in one or more of the following U.S. patents and patent applications assigned to Commvault Systems, Inc., each of which is hereby incorporated by reference in its entirety herein.

| Title | USPTO Serial No. | U.S. Pat. No. | Filing Date |
| --- | --- | --- | --- |
| Storage System For Provisioning And Storing Data To A Virtual Disk | 14/322,813 | 10,067,722 | Jul. 2, 2014 |
| Method For Writing Data To A Virtual Disk Using A Controller Virtual Machine And Different Storage And Communication Protocols | 14/322,832 | 9,875,063 | Jul. 2, 2014 |
| Disk Failure Recovery For Virtual Disk With Policies | 14/322,850 | 9,424,151 | Jul. 2, 2014 |
| Creating And Reverting To A Snapshot Of A Virtual Disk | 14/322,855 | 9,558,085 | Jul. 2, 2014 |
| Cloning A Virtual Disk In A Storage Platform | 14/322,867 | 9,798,489 | Jul. 2, 2014 |
| Writing To A Storage Platform Including A Plurality Of Storage Clusters | 14/322,868 | 9,483,205 | Jul. 2, 2014 |
| Time Stamp Generation For Virtual Disks | 14/322,871 | 9,411,534 | Jul. 2, 2014 |
| Method For Writing Data To Virtual Disk Using A Controller Virtual Machine And Different Storage And Communication Protocols On A Single Storage Platform | 14/684,086 | 9,864,530 | Apr. 10, 2015 |
| Dynamically Splitting A Range Of A Node In A Distributed Hash Table | 14/723,380 | Abandoned | May 27, 2015 |
| Storage System With Virtual Disks | PCT/US2015/38687 | Expired | Jun. 30, 2015 |
| Global De-Duplication Of Virtual Disks In A Storage Platform | 15/155,838 | 10,846,024 | May 16, 2016 |
| De-Duplication Of Client-Side Data Cache For Virtual Disks | 15/156,015 | 10,795,577 | May 16, 2016 |
| Persistent Reservations For Virtual Disk Using Multiple Targets | 15/163,446 | 10,248,174 | May 24, 2016 |
| Synchronization Of Metadata In A Distributed Storage System | 15/834,921 | 10,740,300 | Dec. 7, 2017 |
| In-Flight Data Encryption/Decryption For A Distributed Storage Platform | 15/912,374 | 10,848,468 | Mar. 5, 2018 |
| Persistent Reservations For Virtual Disk Using Multiple Targets | 16/274,014 | 10,691,187 | Feb. 12, 2019 |
| Distributed Data Storage System Using Erasure Coding On Storage Nodes Fewer Than Data Plus Parity Fragments | 63/053,414 | NA | Jul. 17, 2020 |

-continued

| Title | USPTO Serial No. | U.S. Pat. No. | Filing Date |
|---|---|---|---|
| Distributed Data Storage System Using Erasure Coding On Storage Nodes Fewer Than Data Plus Parity Fragments | 63/065,722 | NA | Aug. 14, 2020 |
| Optimized Deduplication Based On Backup Frequency In A Distributed Data Storage System | 63/070,162 | NA | Aug. 25, 2020 |
| Anti-Entropy-Based Metadata Recovery In A Strongly Consistent Distributed Data Storage System | 63/081,503 | NA | Sep. 22, 2020 |
| Commissioning And Decommissioning Metadata Nodes In A Running Distributed Data Storage System | 63/082,624 | NA | Sep. 24, 2020 |
| Container Data Mover For Migrating Data Between Distinct Distributed Data Storage Systems Integrated With Application Orchestrators | 63/082,631 | NA | Sep. 24, 2020 |
| Optimized Deduplication Based On Backup Frequency In A Distributed Data Storage System | 17/153,667 | | Jan. 20, 2021 |
| Cloud-Based Distributed Data Storage System Using Block-Level Deduplication Based On Backup Frequencies Of Incoming Backup Copies | 17/153,674 | | Jan. 20, 2021 |
| Container Data Mover For Migrating Data Between Distributed Data Storage Systems Integrated With Application Orchestrators | 17/179,160 | | Feb. 18, 2021 |
| Commissioning And Decommissioning Metadata Nodes In A Running Distributed Data Storage System (Attorney Docket No.: COMMV.622A1 Applicant Matter No.: 100.693.US1.160) | TBD | | TBD |
| Decommissioning, Re Commissioning, And Commissioning New Metadata Nodes In A Working Distributed Data Storage System (Attorney Docket No.: COMMV.622A2 Applicant Matter No.: 100.693.U52.160) | TBD | | TBD |

Distributed Data Storage System

An example embodiment of the disclosed distributed data storage system is the Commvault Distributed Storage (f/k/a Hedvig Distributed Storage Platform) now available from Commvault Systems, Inc. of Tinton Falls, N.J., USA, and thus some of the terminology herein originated with the Hedvig product line. The illustrative distributed data storage system comprises a plurality of storage service nodes that form one or more storage clusters. Data reads and writes originating from an application on an application host computing device are intercepted by a storage proxy, which is co-resident with the originating application. The storage proxy performs some pre-processing and analysis functions before making communicative contact with the storage cluster. The system ensures strong consistency of data and metadata written to the storage service nodes.

Data and Metadata. The term "metadata" is distinguished herein from the term "data." Accordingly, "data" will refer to "payload" data, which is typically generated by an application or other data source that uses the distributed data storage system for data storage. Thus, the terms "data", "payload", and "payload data" will be used interchangeably herein. On the other hand, "metadata" will refer to other information in the distributed data storage system, e.g., information about the payload data, about the components hosting the payload data, about metadata-hosting components, about other components of the distributed data storage system, and also information about the metadata, i.e., "metametadata."

Storage Service, e.g., Hedvig Storage Service. The storage service is a software component that installs on commodity x86 or ARM servers to transform existing server and storage assets into a fully-featured elastic storage cluster. The storage service may deploy to an on-premises infrastructure, to hosted clouds, and/or to public cloud computing environments, in any combination, to create a single system.

Storage Service Node (or storage node), e.g., Hedvig Storage Server (HSS), comprises both computing and storage resources that collectively provide storage service. The system's storage service nodes collectively form one or more storage clusters. Multiple groups of storage service nodes may be clustered in geographically and/or logically disparate groups, e.g., different cloud computing environments, different data centers, different usage or purpose of a storage cluster, etc., without limitation, and thus the present disclosure may refer to distinct storage clusters in that context. One or more of the following storage service subsystems of the storage service may be instantiated at and may operate on a storage service node: (i) distributed fault-tolerant metadata subsystem providing metadata service, e.g., "Hedvig Pages"; (ii) distributed fault-tolerant data subsystem (or data storage subsystem) providing payload data storage, e.g., "Hedvig HBlock"; and (iii) distributed fault-tolerant pod subsystem for generating and maintaining certain system-level information, e.g., "Hedvig HPod." The system stores payload data on certain dedicated storage resources managed by the data storage subsystem, and stores metadata on other dedicated storage resources managed by the metadata subsystem. Thus, another way to distinguish payload data from metadata in the illustrative system is that payload data is stored in and maintained by the data storage subsystem and metadata is stored in and maintained by the metadata subsystem. The pod subsystem, the metadata subsystem, and the data storage subsystem are all partitioned and replicated across various storage service nodes. These subsystems operate as independent services, they need not be co-located on the same storage service node, and they may communicate with a subsystem on another storage service node as needed.

Replica. The distributed data storage system replicates data and metadata across multiple storage service nodes. A "replica" or "replica node" is a storage service node that hosts a replicated copy of data and/or metadata that is also stored on other replica nodes. Illustratively, metadata uses a replication factor of 3 ("RF3"), though the invention is not so limited. Thus, with a replication factor of 3, each portion of metadata is replicated on three distinct metadata nodes across the storage cluster. Data replicas and metadata replicas need not be the same nodes and can reside on distinct storage service nodes that do not overlap.

Virtual Disk ("vdisk") and Storage Containers. The virtual disk is the unit of storage made visible by system 100 to applications and/or application nodes. Every virtual disk provisioned on the system is partitioned into fixed size chunks, each of which is called a storage container. Different replicas are assigned for each storage container. Since replica assignment occurs at the storage container level—not at a virtual disk level—the data for a virtual disk is distributed across a plurality of storage service nodes, thus allowing increased parallelism during I/Os and/or disk rebuilds. Thus, virtual disks are distributed and fault-tolerant.

Storage Pools. Storage pools are logical groupings of physical disks/drives in a storage service node and are configured as the protection unit for disk/drive failures and rebuilds. Within a replica, one or more storage containers are assigned to a storage pool. A typical storage service node will host two to four storage pools.

Metadata Node. An instance of the metadata subsystem executing on a storage service node is referred to as a metadata node that provides "metadata service." The metadata subsystem executing on a storage service node stores metadata at the storage service node. The metadata node communicates with other metadata nodes to provide a system-wide metadata service. The metadata subsystem also communicates with pod and/or data storage subsystems at the same or other storage service nodes. A finite set of unique identifiers referred to as keys form a metadata "ring" that is the basis for consistent hashing in the distributed data storage system, which is designed for strong consistency.

Each metadata node "owns" one or more regions of the metadata ring, i.e., owns one or more ranges of keys within the ring. The ring is subdivided among the metadata nodes so that any given key is associated with a defined metadata owner and its replica nodes, i.e., each key is associated with a defined set of metadata node replicas. The range(s) of keys associated with each metadata node governs which metadata is stored, maintained, distributed, replicated, and managed by the owner metadata node. Tokens delineate range boundaries. Each token is a key in the metadata ring that acts as the end of a range. Thus a range begins where a preceding token leaves off and ends with the present token. Some metadata nodes are designated owners of certain virtual disks whereas others are replicas but not owners. Owner nodes are invested with certain functionality for managing the owned virtual disk.

Data Node. An instance of the data storage service executing on a storage service node is referred to as a Data Node that provides payload data storage, i.e., comprises payload data associated with and tracked by metadata.

Metadata Node Identifier or Storage Identifier (SID) is a unique identifier of the metadata service instance on a storage service node, i.e., the unique system-wide identifier of a metadata node. A similar term identifies the tokens that a metadata node is responsible for, but if the node SID has form X, the token SID has form X$i, where i is a number, the index number of the token among the metadata node's keys within the range.

Storage Proxy. Each storage proxy is a lightweight software component that deploys at the application tier, i.e., on application servers or hosts. A storage proxy may be implemented as a virtual machine (VM) or as a software container (e.g., Docker), or may run on bare metal to provide storage access to any physical host or VM in the application tier. As noted, the storage proxy intercepts reads and writes issued by applications and directs input/output (I/O) requests to the relevant storage service nodes.

Erasure Coding (EC). In some embodiments, the illustrative distributed data storage system employs erasure coding rather than or in addition to replication. EC is one of the administrable attributes for a virtual disk. The default EC policy is (4,2), but (8,2) and (8,4) are also supported if a sufficient number of storage service nodes are available. The invention is not limited to a particular EC policy unless otherwise noted herein.

FIG. 1A is a block diagram depicting a distributed data storage system 100 according to an illustrative embodiment. The figure depicts: a plurality of application nodes 102 that form an "application tier," each application node comprising a storage proxy 106 and one of components 103A, 104A, and 105A; and a storage cluster 110 comprising a plurality of separately scalable storage service nodes 120 and a plurality of specially-equipped compute hosts 121. Distributed data storage system 100 (or system 100) comprises storage proxies 106 and storage cluster 110. System 100 flexibly leverages both hyperscale and hyperconverged deployment options, sometimes implemented in the same storage cluster 110 as depicted here. Hyperscale deployments scale storage resources independently from the application tier, as shown by storage service nodes 120 (e.g., 120-1 . . . 120-N). In such hyperscale deployments, storage capacity and performance scale out horizontally by adding commodity servers running the illustrative storage service; application nodes (or hosts) 102 scale separately along with storage proxy 106. On the other hand, hyperconverged deployments scale compute and storage in lockstep, with workloads and applications residing on the same physical nodes as payload data, as shown by compute hosts 121. In such hyperconverged deployments, storage proxy 106 and storage service software 122 are packaged and deployed as VMs on a compute host 121 with a hypervisor 103 installed. In some embodiments, system 100 provides plug-ins for hypervisor and virtualization tools, such as VMware vCenter, to provide a single management interface for a hyperconverged solution.

System 100 provides enterprise-grade storage services, including deduplication, compression, snapshots, clones, replication, auto-tiering, multitenancy, and self-healing of both silent corruption and/or disk/node failures to support production storage operations, enterprise service level agreements (SLAs), and/or robust storage for backed up data (secondary copies). Thus, system 100 eliminates the need for enterprises to deploy bolted-on or disparate solutions to deliver a complete set of data services. This simplifies infrastructure and further reduces overall Information Technology (IT) capital expenditures and operating expenses. Enterprise storage capabilities can be configured at the granularity of a virtual disk, providing each data originator, e.g., application, VM, and/or software container, with its own unique storage policy. Every storage feature can be switched on or off to fit the specific needs of any given workload. Thus, the granular provisioning of features empowers administrators to avoid the challenges and compromises of "one size fits all" storage and helps effectively support business SLAs, while decreasing operational costs.

System 100 inherently supports multi-site availability, which removes the need for additional costly disaster recovery solutions. The system provides native high availability storage for applications across geographically dispersed data centers by setting a unique replication policy and replication factor at the virtual disk level. System 100 comprises a "shared-nothing" distributed computing architecture in which each storage service node is independent and self-sufficient. Thus, system 100 eliminates any single point of failure, allows for self-healing, provides non-disruptive upgrades, and scales indefinitely by adding more storage service nodes. Each storage service node stores and processes metadata and/or payload data, then communicates with other storage service nodes for data/metadata distribution according to the replication factor.

Storage efficiency in the storage cluster is characterized by a number of features, including: thin provisioning, deduplication, compression, compaction, and auto-tiering. Each virtual disk is thinly provisioned by default and does not consume capacity until data is written therein. This space-efficient dynamic storage allocation capability is especially useful in DevOps environments that use Docker, OpenStack, and other cloud platforms where volumes do not support thin provisioning inherently, but can support it using the virtual disks of system 100. System 100 provides inline global deduplication that delivers space savings across the entire storage cluster. Deduplication is administrable at the virtual disk level to optimize I/O and lower the cost of storing data. As writes occur, the system 100 calculates the unique fingerprint of data blocks and replaces redundant data with a small pointer. The deduplication process can be configured to begin at storage proxy 106, improving write performance and eliminating redundant data transfers over the network. System 100 provides inline compression administrable at the virtual disk level to optimize capacity usage. The system stores only compressed data on the storage service nodes. Illustratively, the Snappy compression library is used, but the invention is not limited to this implementation. To improve read performance and optimize storage space, the illustrative system periodically performs garbage collection to compact redundant blocks and generate large sequential chunks of data. The illustrative system balances performance and cost by supporting tiering of data among high-speed SSDs and lower-tier persistent storage technologies.

Application node (or host) 102 (e.g., 102-1, 102-2, 102-3) is any computing device, comprising one or more hardware processors and computer memory for executing computer programs, that generates and/or accesses data stored in storage cluster 110. Application(s) (not shown here but see, e.g., applications 132 in FIG. 1B) executing on an application node 102 use storage cluster 110 as a data storage resource. Application node 102 can take the form of: a bare metal host 105A for applications with storage proxy 106-3; a virtual machine server with hypervisor 103A and storage proxy 106-1; a container host hosting software container 104A and storage proxy 106-2; and/or another computing device configuration equipped with a storage proxy 106.

Hypervisor 103 (e.g., 103A, 103B) is any hypervisor, virtual machine monitor, or virtualizer that creates and runs virtual machines on a virtual machine server or host. Software container 104A is any operating system virtualization software that shares the kernel of the host computing device (e.g., 102, 121) that it runs on and allows multiple isolated user space instances to co-exist. Docker is an example of software container 104A. Bare metal 105A refers to application node 102-3 running as a traditional computing device without virtualization features. Components 103, 104A, and 105A/B are well known in the art.

Storage proxy 106 (e.g., 106-1, 106-2, 106-3, 106-J . . . 106-K) is a lightweight software component that deploys at the application tier, i.e., on application nodes 102 and/or compute hosts 121. A storage proxy may be implemented as a virtual machine 106-1, as a software container (e.g., Docker) 106-2, and/or running on bare metal (e.g., 106-3) to provide storage access to any physical host or VM in the application tier. The storage proxy acts as a gatekeeper for all I/O requests to virtual disks configured at storage cluster 110. It acts as a storage protocol converter, load balances I/O requests to storage service nodes, caches data fingerprints, and performs certain deduplication functions. Storage protocols supported by storage proxy 106 include Internet Small Computer Systems Interface (iSCSI), Network File System (NFS), Server Message Block (SMB2) or Common Internet File System (CIFS), Amazon Simple Storage Service (S3), OpenStack Object Store (Swift), without limitation. The storage proxy runs in user space and can be managed by any virtualization management or orchestration tool. With storage proxies 106 that run in user space, the disclosed solution is compatible with any hypervisor, software container, operating system, or bare metal computing environment at the application node. In some virtualized embodiments where storage proxy 106 is deployed on a virtual machine, the storage proxy may be referred to as a "controller virtual machine" (CVM) in contrast to application-hosting virtual machines that generate data for and access data at the storage cluster.

Storage cluster 110 comprises the actual storage resources of system 100, such as storage service nodes 120 and storage services 122 running on compute hosts 121. In some embodiments, storage cluster 110 is said to comprise compute hosts 121 and/or storage service nodes 120. Storage service node 120 (e.g., 120-1 . . . 120-N) is any commodity server configured with one or more x86 or ARM hardware processors and with computer memory for executing the illustrative storage service, which is described in more detail in FIG. 1C. Storage service node 120 also comprises storage resources as described in more detail in FIG. 1D. By running the storage service, the commodity server is transformed into a full-featured component of storage cluster 110. System 100 may comprise any number of storage service nodes 120. Compute host 121 (e.g., 121-1 . . . 121-M) is any computing device, comprising one or more hardware processors and computer memory for executing computer programs, that comprises the functional components of an application node 102 and of a storage service node 120 in a "hyperconverged" configuration. In some embodiments, compute hosts 121 are configured, sometimes in a group, within an appliance such as the Commvault Hyperscale™ X backup appliance from Commvault Systems Inc., of Tinton Falls, N.J., USA.

Figure 1B:
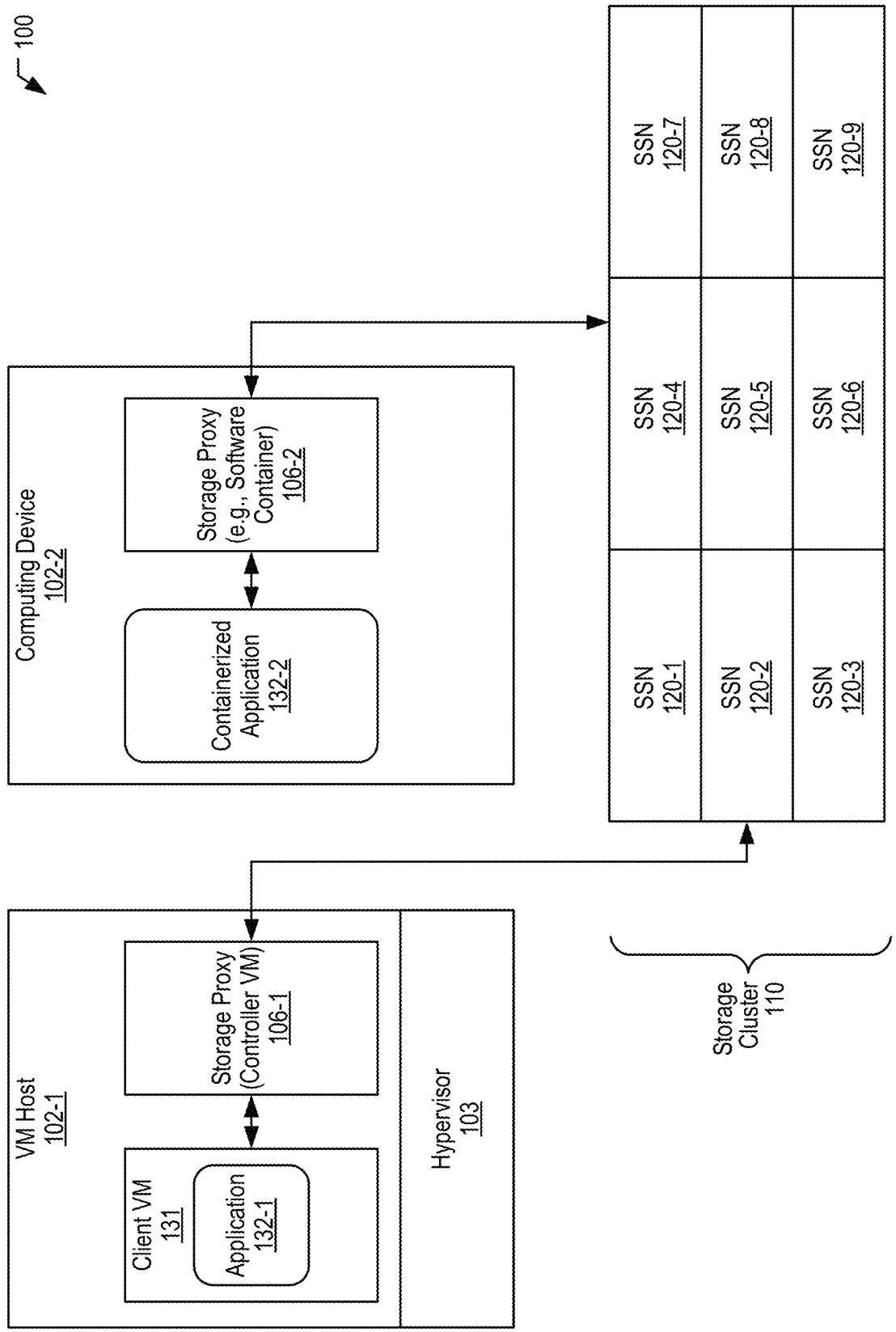
FIG. 1B is a block diagram illustrating some details of the distributed data storage system 100 comprising separately scalable storage service nodes according to an illustrative embodiment.

FIG. 1B is a block diagram illustrating some details of the distributed data storage system 100 comprising separately scalable storage service nodes 120 according to an illustrative embodiment. The figure depicts: application node 102-1 embodied as a VM host and hosting hypervisor 103, storage proxy 106-1 embodied as a controller virtual machine, and client VM 131 hosting application 132-1; application node 102-2 hosting containerized storage proxy 106-2 and containerized application 132-2; and storage cluster 110 comprising nine (9) distinct physical storage service nodes 120 (e.g., 120-1 . . . 120-9). Virtual machine hosts, virtual machines, and hypervisors are well known in the art. Although not expressly depicted in the present figure, in some embodiments, an application orchestrator node (e.g., Kubernetes node and/or Kubernetes kubelet and/or another Kubernetes-based technology, etc.) may be implemented as an application node 102 instead of, or in addition to, components 102-1, 102-2, and 102-3. In such a configuration, the application orchestrator node comprises or hosts one or more containerized applications (e.g., 132-2) and a containerized storage proxy 106 (e.g., 106-2), as well as a container storage interface (CSI) driver that is preferably implemented as an enhanced and proprietary CSI driver, such the one disclosed in one or more patent applications deriving priority from U.S. Provisional Patent Application 63/082,631 filed on Sep. 24, 2020.

Application 132 (e.g., 132-1, 132-2) is any software that executes on its underlying host (e.g., 102-1, 102-2) and performs a function as a result. The application 132 may generate data and/or need to access data which is stored in system 100. Examples of application 132 include email applications, database management applications, office productivity software, backup software, etc., without limitation.

The bi-directional arrows between each storage proxy 106 and a storage service node 120 depict the fact that communications between applications 132 and storage cluster 110 pass through storage proxies 106, each of which identifies a proper storage service node 120 to communicate with for the present transaction, e.g., storage service node 120-2 for storage proxy 106-1, storage service node 120-4 for storage proxy 106-2, without limitation.

FIG. 1C is a block diagram depicting certain subsystems of the storage service of distributed data storage system 100, according to an illustrative embodiment. Depicted here are: storage proxy 106; application 132; and a storage service node 120 comprising a pod subsystem 130 (e.g., Hedvig "HPOD"), a metadata subsystem 140 (e.g., Hedvig "PAGES"), and a data storage subsystem 150 (e.g., Hedvig "HBLOCK"). Although storage service node 120 as depicted here comprises an instance of all three storage service subsystems, any given storage service node 120 need not comprise all three subsystems. Thus, a subsystem running on a given storage service node may communicate with one or more subsystems on another storage service node as needed to complete a task or workload.

Storage proxy 106 intercepts reads and writes issued by applications 132 that are targeted to particular virtual disks configured in storage cluster 110. Storage proxy 106 provides native block, file, and object storage protocol support, as follows. Block storage—system 100 presents a block-based virtual disk through a storage proxy 106 as a logical unit number (LUN). Access to the LUN, with the properties applied during virtual disk provisioning, such as compression, deduplication and replication, is given to a host as an iSCSI target. After the virtual disk is in use, the storage proxy translates and relays all LUN operations to the underlying storage cluster. File storage—system 100 presents a file-based virtual disk to one or more storage proxies 106 as an NFS export, which is then consumed by the hypervisor as an NFS datastore. Administrators can then provision VMs on that NFS datastore. The storage proxy acts as an NFS server that traps NFS requests and translates them into the appropriate remote procedure call (RPC) calls to the back-end storage service node. Object storage—buckets created via the Amazon S3 API, or storage containers created via the OpenStack Swift API, are translated via the storage proxies 106 and internally mapped to virtual disks 170. The storage cluster 110 acts as the object (S3/Swift) target, which client applications 132 can utilize to store and access objects.

Storage Proxy 106 comprises one or more caches that enable distributed operations and the performing of storage system operations locally at the application node 102 to accelerate read/write performance and efficiency. An illustrative metacache stores metadata locally at the storage proxy, preferably on SSDs. This cache eliminates the need to traverse the network for metadata lookups, leading to substantial read acceleration. For virtual disks provisioned with client-side caching, an illustrative block cache stores data blocks to local SSD drives to accelerate reads. By returning blocks directly from the storage proxy, read operations avoid network hops when accessing recently used data. For virtual disks provisioned with deduplication, an illustrative dedupe cache resides on local SSD media and stores fingerprint information of certain data blocks written to storage cluster 110. Based on this cache, the storage proxy determines whether data blocks have been previously written and if so, avoids re-writing these data blocks again. Storage proxy 106 first queries the dedupe cache and if the data block is a duplicate, storage proxy 106 updates the metadata subsystem 140 to map the new data block(s) and acknowledges the write to originating application 132. Otherwise, storage proxy 106 queries the metadata subsystem 140 and if the data block was previously written to storage cluster 110, the dedupe cache and the metadata subsystem 140 are updated accordingly, with an acknowledgement to originating application 132. Unique new data blocks are written to the storage cluster as new payload data. More details on reads and writes are given in FIGS. 1E and 1F.

A simplified use case workflow comprises: 1. A virtual disk 170 is administered with storage policies via a web-based user interface, a command line interface, and/or a RESTful API (representational state transfer application programming interface). 2. Block and file virtual disks are attached to a storage proxy 106, which presents the storage resource to application hosts, e.g., 102. For object storage, applications 132 directly interact with the virtual disk via Amazon S3 or OpenStack Swift protocols. 3. Storage proxy 106 intercepts application 132 I/O through the native storage protocol and communicates it to the underlying storage cluster 110 via remote procedure calls (RPCs). 4. The storage service distributes and replicates data throughout the storage cluster based on virtual disk policies. 5. The storage service conducts background processes to auto-tier and balance across racks, data centers, and/or public clouds based on virtual disk policies.

Pod subsystem 130 maintains certain system-wide information for synchronization purposes and comprises processing and tracking resources and locally stored information. A network of pods 130 throughout storage cluster 110, where each pod comprises three nodes, is used for managing transactions for metadata updates, distributed-atomic-counters as a service, tracking system-wide timeframes such as generations and epochs, etc. More details on the pod subsystem may be found in U.S. Pat. No. 9,483,205 B2, which is incorporated by reference in its entirety herein.

Metadata subsystem 140 comprises metadata processing resources and partitioned replicated metadata stored locally at the storage service node. Metadata subsystem 140 receives, processes, and generates metadata. Metadata in system 100 is partitioned and replicated across a plurality of metadata nodes. Typically, metadata subsystem 140 is configured with a replication factor of 3 (RF3), and therefore many of the examples herein will include 3-way replication scenarios, but the invention is not so limited. Each metadata subsystem 140 tracks the state of data storage subsystems 150 and of other metadata subsystems 140 in storage cluster 110 to form a global view of the cluster. Metadata subsystem 140 is responsible for optimal replica assignment and tracks writes in storage cluster 110.

Data storage subsystem 150 receives, processes, and stores payload data written to storage cluster 110. Thus, data storage subsystem 150 is responsible for replicating data to other data storage subsystems 150 on other storage service nodes and striping data within and across storage pools. Data storage subsystem 150 comprises storage processing for payload data blocks (e.g., I/O, compaction, garbage collection, etc.) and stores partitioned replicated payload data at the storage service node.

The bold bi-directional arrows in the present figure show that metadata is communicated between storage proxy 106 and metadata subsystem 140, whereas data blocks are transmitted to/from data storage subsystem 150. Depending on the configuration, metadata subsystem 140 may operate on a first storage service node 120 or storage service 122 and data storage subsystem 150 may operate on another distinct storage service node 120 or storage service 122. See also FIGS. 1E and 1F.

Figure 1D:
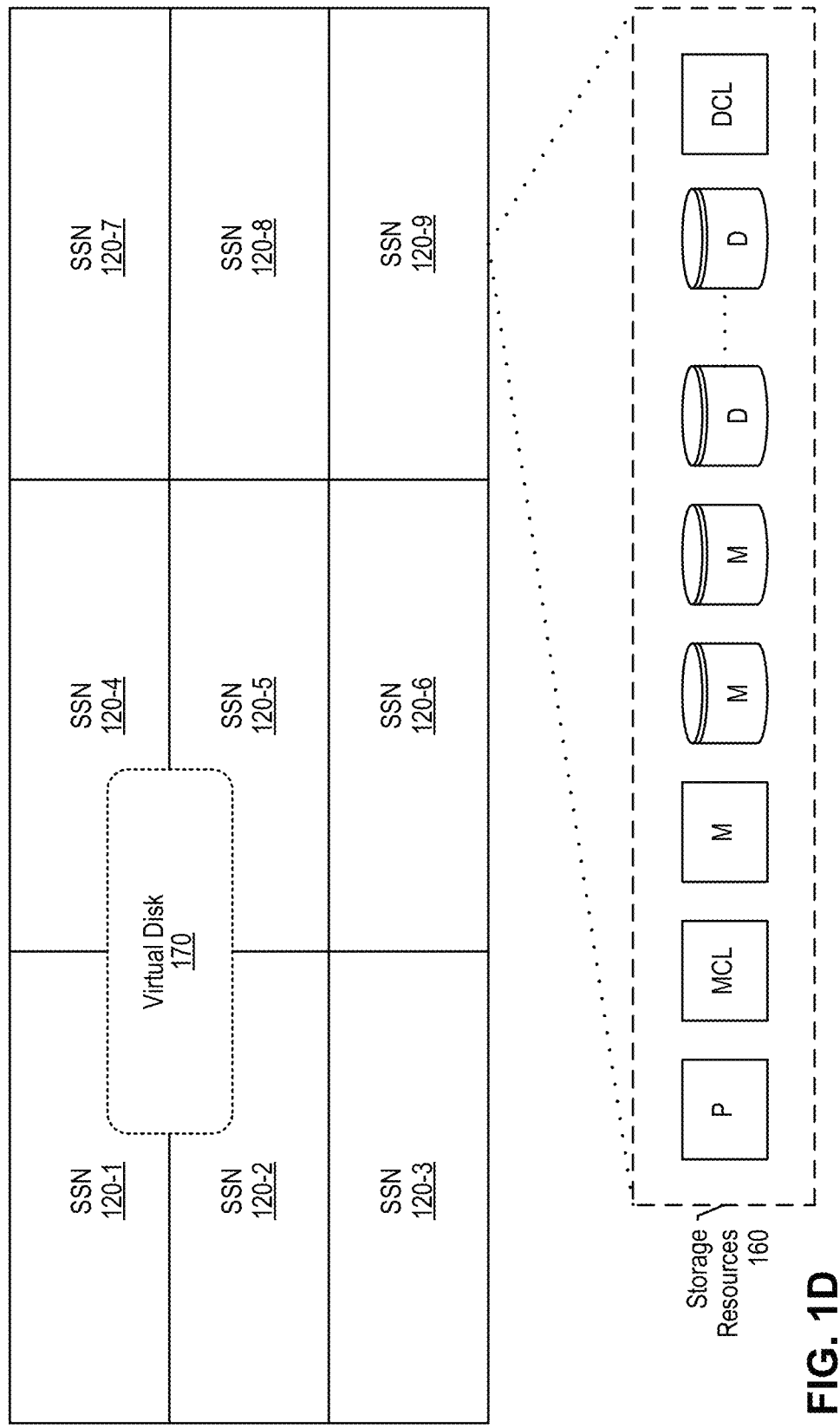
FIG. 1D is a block diagram depicting a virtual disk distributed across a plurality of storage service nodes and also depicting a plurality of storage resources available at each storage service node according to an illustrative embodiment.

FIG. 1D is a block diagram depicting a virtual disk distributed across a plurality of storage service nodes and also depicting a plurality of storage resources available at each storage service node according to an illustrative embodiment. The present figure depicts: nine storage service nodes 120 (120-1 . . . 120-09); a virtual disk 170 that comprises data distributed over four of the storage service nodes —120-1, 120-2, 120-4, and 120-5; and storage resources 160 configured within storage service node 120-9.

Each storage service node 120 (or compute host 121) is typically configured with computing resources (e.g., hardware processors and computer memory) for providing storage services and with a number of storage resources 160, e.g., hard disk drives (HDD) shown here as storage disk shapes, solid state storage drives (SSD) (e.g., flash memory technology) shown here as square shapes, etc. The illustrative system uses commit logs, which are preferably stored on SSD before they are flushed to another disk/drive for persistent storage. Metadata commit logs are stored on dedicated metadata-commit-log drives "MCL", whereas payload-data commit logs are stored on distinct dedicated data-commit-log drives "DCL." As an example depicted in the present figure, pod subsystem information is stored in storage resource "P" which is preferably SSD technology for faster read/write performance. The metadata commit log is stored in storage resource "MCL" which is preferably SSD technology; metadata is then flushed from the commit log to persistent storage "M" (SSD and/or HDD); the data commit log is stored in storage resource "DCL" which is preferably SSD technology; payload data is then flushed from the data commit log to persistent storage "D" (typically HDD). The storage resources 160 depicted in the present figures are shown here as non-limiting examples to ease the reader's understanding; the numbers and types of storage technologies among storage resources 160 will vary according to different implementations. The present solution enforces device-technology (e.g., SSD-to-SSD) metadata recovery in some embodiments. See also FIG. 6.

To accelerate read operations, client-side caching of data is used on SSDs accessible by the storage proxy 106. Data is also cached on SSDs at storage service nodes. For caching, the system supports the use of Peripheral Component Interconnect Express (PCIe) and Non-Volatile Memory Express (NVMe) SSDs. All writes are executed in memory and flash (SSD/NVMe) and flushed sequentially to persistent storage. Persistent storage uses flash technology (e.g., multi-level cell (MLC) and/or 3D NAND SSD) and/or spinning disk technology (e.g., HDD)). Options are administrable at the virtual disk level.

Virtual disk ("vdisk") 170 is the data storage representation of system 100 that is visible to and accessible by applications 132 as data storage resources. In other words, each application 132 will use one or more virtual disks 170 for data storage without having knowledge of how system 100 as a whole is organized and configured. Every virtual disk 170 provisioned on the system is partitioned into fixed size chunks, each of which is called a storage container. Different replicas are assigned for each storage container. Since replica assignment occurs at the storage container level—not at a virtual disk level—the data for a virtual disk is distributed across a plurality of storage service nodes, thus allowing increased parallelism during I/Os and/or disk rebuilds. Thus, the virtual disks are distributed and fault-tolerant. Notably, the replication factor alone (e.g., RF3) does not limit how many storage service nodes 120 may comprise payload data of a given virtual disk 170. Thus, different containers of the virtual disk may be stored and replicated on different storage service nodes, adding up to more total storage service nodes associated with the virtual disk than the replication factor of the virtual disk.

Any number of virtual disks 170 may be spun up, each one thinly provisioned and instantly available. Illustrative user-configurable attributes for virtual disk 170 include without limitation: Name—a unique name to identify the virtual disk. Size—to set the desired virtual disk size. System 100 supports single block and NFS virtual disks of unlimited size. Disk Type—to specify the type of storage protocol to use for the virtual disk: block or file (NFS). Object containers/buckets are provisioned directly from OpenStack via Swift, via the Amazon S3 API, etc. Workload Type—for NFS disk type, options include default, proprietary, or object storage target (OST) workload types. For proprietary and OST, if Enable Deduplication is selected, a Retention Policy can be added as well. For block disk type, the only option is default. Retention Policy—specifies a duration for proprietary and OST workloads, e.g., two weeks, one month, etc. Encryption—to encrypt both data at rest and data in flight for the virtual disk. Enable Deduplication—to enable inline global deduplication. Clustered File System—to indicate that the virtual disk will be used with a clustered file system. When selected, system 100 enables concurrent read/write operations from multiple VMs or hosts. Description—to provide an optional brief description of the virtual disk. Compressed—to enable virtual disk compression to reduce data size. Client-Side Caching—to cache data to local SSD or PCIe devices at the application tier to accelerate read performance. CSV—to enable Cluster Shared Volumes for failover (or high availability) clustering. A CSV is a shared disk containing a Windows NT File System (NTFS) or Resilient File System (ReFS) volume that is made accessible for read and write operations by all nodes within a Windows Server failover cluster. Replication Policy—to set the policy for how data will replicate across the cluster: Agnostic, Rack Aware, or Data Center Aware. Replication Factor (RF)—to designate the number of replicas for each virtual disk. Replication factor is tunable, typically ranging from one to six, without limitation. Block Size—to set a block virtual disk size to 512 bytes, 4 k or 64 k. File (NFS)-based virtual disks have a standard 512 size, and object-based virtual disks have a standard 64K size. Residence—to select the type of media on which the data is to reside: HDD, SSD. The present figure depicts only one virtual disk 170 for illustrative purposes, but system 100 has no limits on how many virtual disks it may support.

Figure 1E:
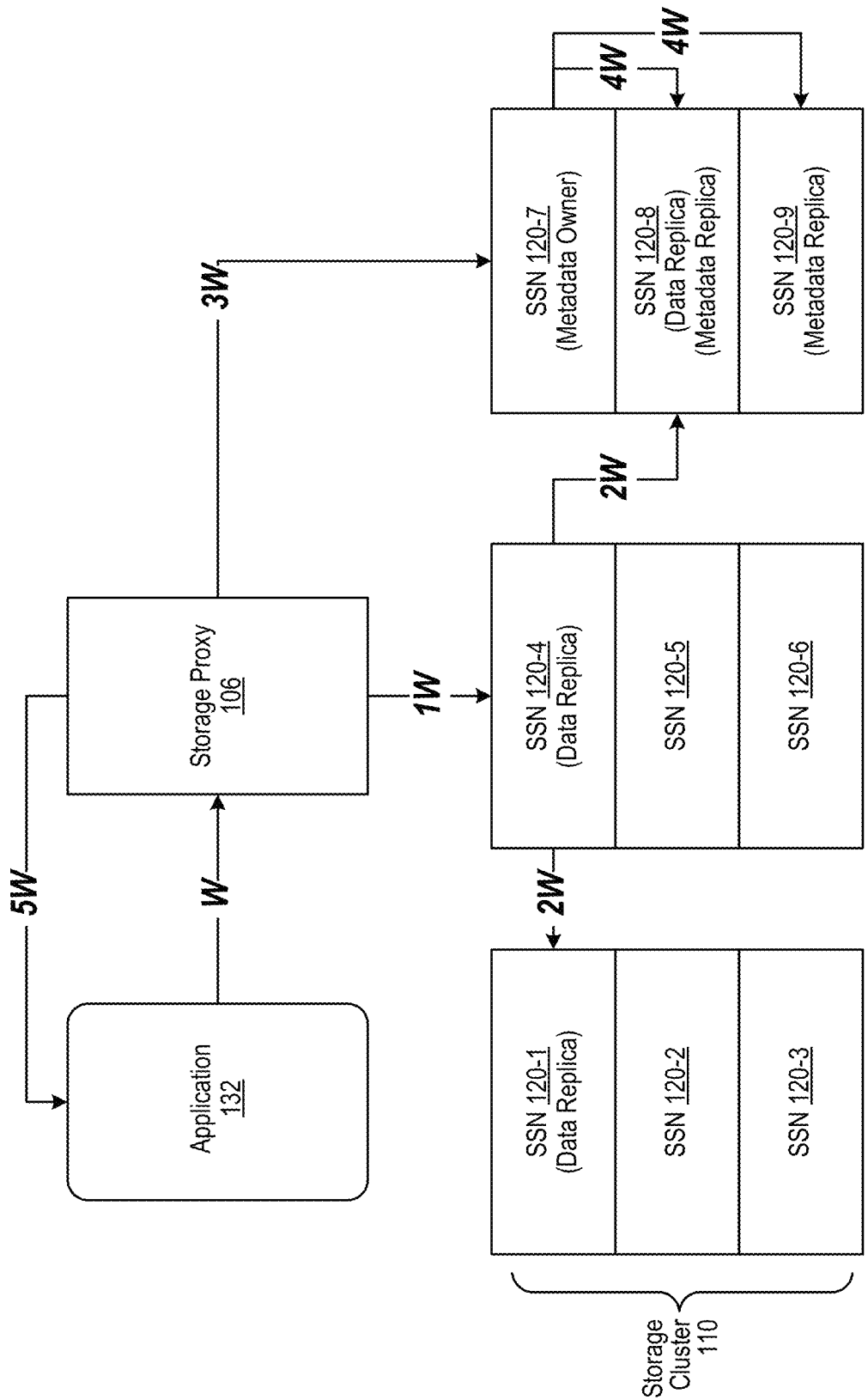
FIG. 1E is a block diagram depicting a typical I/O workflow for write operations originating with an application.

FIG. 1E is a block diagram depicting a typical I/O workflow for write operations originating with an application. This figure depicts an application 132 writing to storage cluster 110, illustratively writing to a virtual disk 170 configured with Replication Factor=3 (RF3).

At step W, storage proxy 106 intercepts a write command issued by application 132, comprising one or more payload data blocks to be written to a virtual disk 170 in storage cluster 110. The write command typically identifies the targeted virtual disk 170 and also identifies a targeted inode (data file identifier) that is to receive the payload data. At step 1W, storage proxy 106 determines replica nodes 120 for the data blocks to be written to and transmits the data blocks to one such replica node, e.g., 120-4. If the virtual disk is enabled for deduplication, the storage proxy 106 calculates a data block fingerprint, queries the dedupe cache and, if necessary, further queries metadata subsystem 140 (at the virtual disk's metadata owner node, e.g., 120-7), and either makes a metadata update or proceeds with a new payload write. At step 2W, the data storage subsystem 150 on replica node 120-4 receives and writes the data blocks locally and additionally distributes them to other designated replica nodes, e.g., 120-1 and 120-8. For RF3, two acknowledged successful writes are needed from the three (RF3) replicas to satisfy the quorum (RF/2+1=3/2+1=2). Two of the three replicas are written synchronously, and one may be written asynchronously. For EC, a different quorum value applies, but the same principle is used: the data block write is deemed successful after the quorum is met and acknowledged back to the node that distributed the data fragments. At step 3W, storage proxy 106 causes an atomic write to be made into metadata subsystem 140 at metadata owner node 120-7, which tracks the successful write of the payload data into the data storage subsystem 150. At step 4W, metadata subsystem 140 replicates the metadata from node 120-7 to designated metadata replica nodes, e.g., 120-8 and 120-9. At step 5W, storage proxy 106 sends a write acknowledgment back to the originating application 132 after the payload data and the metadata have been successfully written to the appropriate storage service nodes.

Figure 1F:
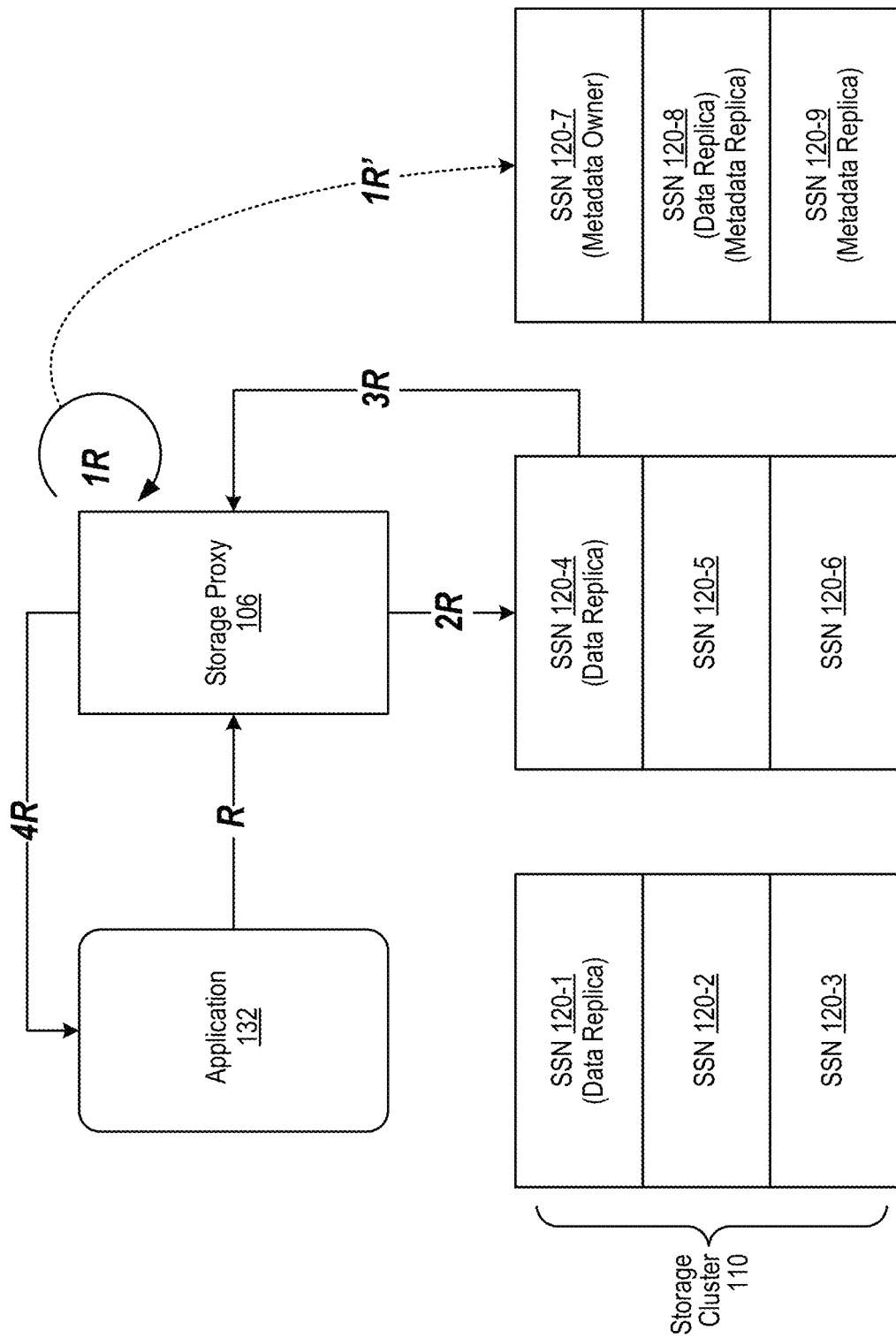
FIG. 1F is a block diagram depicting a typical I/O workflow for read operations originating with an application.

FIG. 1F is a block diagram depicting a typical I/O workflow for read operations originating with an application. This figure depicts an application 132 reading from storage cluster 110, illustratively reading from a virtual disk 170 configured with RF3.

At step R, storage proxy 106 intercepts a read request issued by application 132 for one or more data blocks from a virtual disk 170 in storage cluster 110. At step 1R, storage proxy 106 queries the local metacache for a particular data block to be read and if the information is not found in the local metacache, at step 1R' storage proxy 106 consults metadata subsystem 140 (e.g., at the vdisk's designated metadata owner node 120-7). At step 2R, storage proxy 106 sends the data block details to one of the closest data storage subsystems 150, based on observed latency, e.g., storage service node 120-4. At step 3R, the data storage subsystem 150 reads the data block(s) and transmits the block(s) back, if found, to storage proxy 106. If the read operation fails due to any error, the read is attempted from another replica. At step 4R, storage proxy 106 serves the requested data block(s) to application 132. If client-side caching is enabled for the targeted virtual disk 170 during provisioning, the storage proxy 106 queries the local block cache at step 1R to fetch the data block(s), and if found therein serves the data block(s) to application 132 at step 4R, thereby bypassing the data storage subsystem 150 at the storage service nodes(s) and eliminating the need to traverse the network to reach storage cluster 110.

System Resiliency. System 100 is designed to survive disk, node, rack, and data center outages without application downtime and with minimal performance impact. These resiliency features include: high availability, non-disruptive upgrades (NDU), disk failures, replication, and snapshots and clones.

High Availability. A preferable minimum of three storage service node should be provisioned for an implementation of the illustrative system. Redundancy can be set as agnostic, at the rack level, or at data center level. The system initiates transparent failover in case of failure. During node, rack, or site failures, reads and writes continue as usual from/to remaining operational replicas. To protect against a single point of failure, storage proxies 106 install as a high availability active/passive pair ("HA pair," not shown). A virtual IP address (VIP) assigned to the HA pair redirects traffic automatically to the active storage proxy 106 at any given time. If one storage proxy 106 instance is lost or interrupted, operations fail over seamlessly to the passive instance to maintain availability. This happens without requiring intervention by applications, administrators, or users. During provisioning, administrators can indicate that an application host 102/121 will use a clustered file system. This automatically sets internal configuration parameters to ensure seamless failover when using VM migration to a secondary physical host running its own storage proxy 106. During live VM migration, such as VMware vMotion or Microsoft Hyper-V, any necessary block and file storage "follows" guest VMs to another host.

Non-Disruptive Upgrades (NDUs). The illustrative system supports non-disruptive software upgrades by staging and rolling the upgrade across individual components using the highly available nature of the platform to eliminate any downtime or data unavailability. Storage service nodes 120 and storage services 122 undergo upgrades first one node at a time. Meanwhile, any I/O continues to be serviced from alternate available nodes, e.g., replicas. Storage proxies 106 are upgraded next, starting with the passive storage proxy in HA pairs. After the passive storage proxy upgrade is complete, it is made active, and the formerly active storage proxy 106 is upgraded and resumes service as the passive of the HA pair. This process eliminates any interruption to reads or writes during the upgrade procedure.

Disk Failures. The illustrative system supports efficient data and metadata rebuilds that are initiated automatically when there is a disk failure. Payload data is rebuilt from other data replicas and using information in the metadata subsystem. The metadata rebuild self-heals within the metadata service.

Replication. The illustrative system uses a combination of synchronous and asynchronous replication processes to distribute and protect data across the cluster and provide near-zero recovery point objectives (RPO) and recovery time objectives (RTO). For example, two of three replicas are written synchronously, and one is written asynchronously. The system supports any number of active data centers in a single storage cluster 110, using a tunable replication factor and replication policy options. The replication factor designates the number of replicas to create for each virtual disk, and the replication policy defines the destination for the replicas across the cluster. Replicas occur at the storage container level of a virtual disk 170. For example, if a 100 GB virtual disk with RF3 is created, the entire 100 GBs are not stored as contiguous chunks on three storage service nodes. Instead, the 100 GBs are divided among several storage containers, and replicas of each storage container are spread across different storage pools on different storage service nodes within the storage cluster. For additional disaster recovery protection against rack and data center failures, the illustrative system supports replication policies that span multiple racks or data centers using structured IP addressing, DNS naming/suffix, and/or customer-defined snitch endpoints. For "agnostic" replication policies, data is spread across the storage cluster using a best-effort to improve availability. For "rack aware" replication policies, data is spread across as many physically distinct racks as possible within in a single data center. For "data center aware" replication policies, data replicates to additional physical sites, which can include private and/or hosted data centers and public clouds. In a disaster recovery example, where the Replication Policy=Data Center Aware and the Replication Factor=3, the illustrative system divides the data into storage containers and ensures that three copies (RF3) of each storage container are spread to geographically dispersed physical sites, e.g., Data Centers A, B, and C. At any time, if a data copy fails, re-replication is automatically initiated from replicas across the data centers.

Snapshots And Clones. In addition to replication policies, data management tasks include taking snapshots and making "zero-copy" clones of virtual disks. There is no limit to the number of snapshots or clones that can be created. Snapshots and clones are space-efficient, requiring capacity only for changed blocks.

Encryption. The illustrative system provides software-based encryption with the Encrypt360 feature. This enables encryption of data at the point of ingestion (at the storage proxy 106). Data encrypted in this way remains protected in flight between storage proxy 106 and storage service nodes 120/storage service 122, in flight among storage service nodes as part of replication, in-use at storage proxy 106, and at rest while in storage. Any encryption scheme may be implemented, preferably 256-bit AES. Additionally, any third-party key management system can be attached.

Ecosystem Integration. The illustrative system works with and provides a secure data storage system for a variety of data-generating platforms, including systems that generate primary (production) data and systems that generate backup data from primary sources. VMware. The illustrative system features a vCenter plug-in that enables provisioning, management, snapshotting, and cloning of virtual disks 170 directly from the vSphere Web Client. Additionally, the system incorporates support for the VMware vSphere Storage APIs Array Integration (VAAI). Docker. The illustrative system provides persistent storage for Docker software containers through a volume plugin. The volume plugin enables a user to create a persistent Docker volume backed by a virtual disk 170. Different options, such as deduplication, compression, replication factor, and/or block size, may be set for each Docker volume, using "volume options" in the Docker Universal Control Plane (UCP) or using the "docker volume" command line. The virtual disk can then be attached to any host. The volume plugin also creates a file system on this virtual disk and mounts it using the path provided by the user. The file system type can also be configured by the user. All I/O to the Docker volume goes to virtual disk 170. As the software container moves in the environment, virtual disk 170 will automatically be made available to any host, and data will be persisted using the policies chosen during volume creation. For container orchestration platforms, such as Kubernetes and OpenShift, the illustrative system 100 provides persistent storage for software containers through a proprietary dynamic provisioner and via other technologies that interoperate with the orchestration platform(s). OpenStack. The illustrative system delivers block, file, and object storage for OpenStack all from a single platform via native Cinder and Swift integration. The system supports granular administration, per-volume (Cinder) or per-container (Swift), for capabilities such as compression, deduplication, snapshots, and/or clones. OpenStack administrators can provision the full set of storage capabilities of system 100 in OpenStack Horizon via OpenStack's QoS functionality. As with VMware, administrators need not use system 100's native web user interfaces and/or RESTful API, and storage can be managed from within the OpenStack interface.

Multitenancy. The illustrative system supports the use of rack-aware and data center-aware replication policies for customers who must satisfy regulatory compliance and restrict certain data by region or site. These capabilities provide the backbone of a multitenant architecture, which is supported with three forms of architectural isolation: LUN masking, dedicated storage proxies, and complete physical isolation. Using the LUN masking option, different tenants are hosted on a shared infrastructure with logical separation. Logical separation is achieved by presenting virtual disks only to a certain VM and/or physical application host (IP range). Quality of Service (QoS) is delivered at the VM level. Using the dedicated storage proxies option, storage access is provided with a dedicated storage proxy 106 per tenant. Storage proxies can be deployed on a dedicated physical host or a shared host. This provides storage as a shared infrastructure, while compute is dedicated to each tenant. Quality of Service (QoS) is at the VM level. Using the complete physical isolation option, different tenants are hosted on dedicated storage clusters (each running their own storage service and storage proxies) to provide complete logical and physical separation between tenants. For all of these multitenant architectures, each tenant can have unique virtual disks with tenant-specific storage policies, because the illustrative system configures policies at the virtual disk level. Policies can be grouped to create classes of service (CoS).

Thus, the illustrative distributed data storage system scales seamlessly and linearly from a few nodes to thousands of nodes using virtual disks as the user-visible storage resource provided by the system. Enterprise storage capabilities are configurable at the virtual disk level. The storage service nodes can be configured in a plurality of physical computing environments, e.g., data centers, private clouds, and/or public clouds, without limitation.

Figure 2:
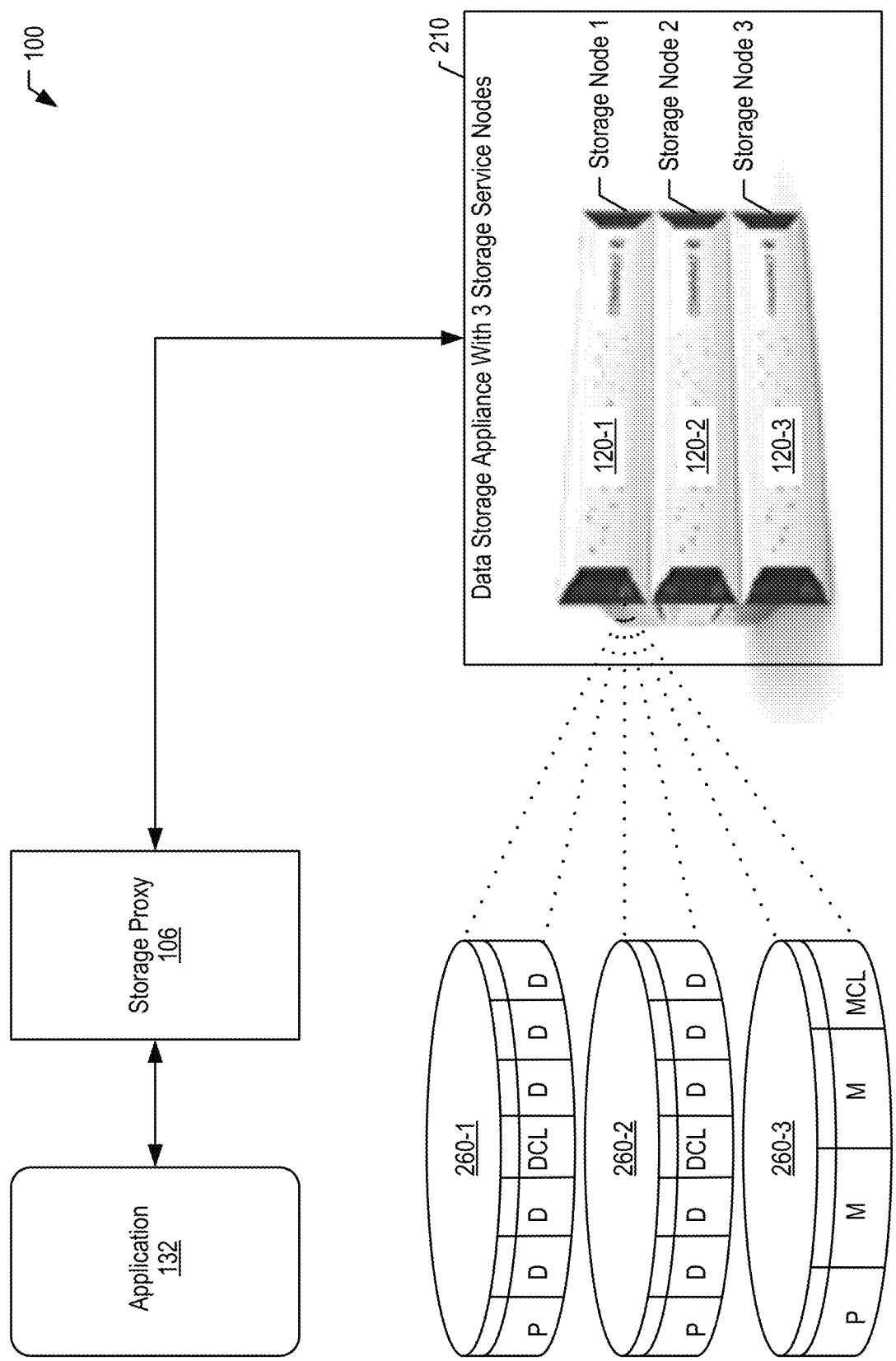
FIG. 2 is a block diagram illustrating some details of the distributed data storage system 100 with a storage appliance that comprises storage service nodes according to an illustrative embodiment.

FIG. 2 is a block diagram illustrating some details of the distributed data storage system 100 with a storage appliance 210 that comprises storage service nodes 120 according to an illustrative embodiment. The figure depicts an application 132 accessing appliance 210 via storage proxy 106. The storage service nodes 120 are configured within a storage appliance 210, depicted in the example here as a 3-node appliance, though the invention is not limited to this configuration. An embodiment of storage appliance 210 is the HyperScale X product from Commvault Systems, Inc. Within appliance 210, each storage service node 120 comprises a plurality of physical disks 260, e.g., three physical disks 260-1, 260-2, and 260-3. To conform with the architecture of the illustrative distributed data storage system, each physical disk 260 within appliance 210 is partitioned and the partitions are logically treated like distinct storage resources ("disks") 160 as shown in the system of FIG. 1D. Accordingly, one physical disk (e.g., 260-3) comprises partitions for metadata (M) and metadata commit logs (MCL), whereas the other physical disks (e.g., 260-1, 260-2) comprise partitions for payload data (D) and payload data commit logs (DCL). Pod subsystem-related information/data also may be stored on one or more of physical disks 260 within each node 120 as indicated by the "P" labels representing a partition reserved for the pod subsystem. However, when a metadata-carrying physical disk (e.g., 260-3) fails within appliance 210, information may be lost from many, possibly from all, partitions of the failed physical disk. Therefore, particular recovery techniques address the storage appliance configuration. See also FIG. 5.

Figure 3A:
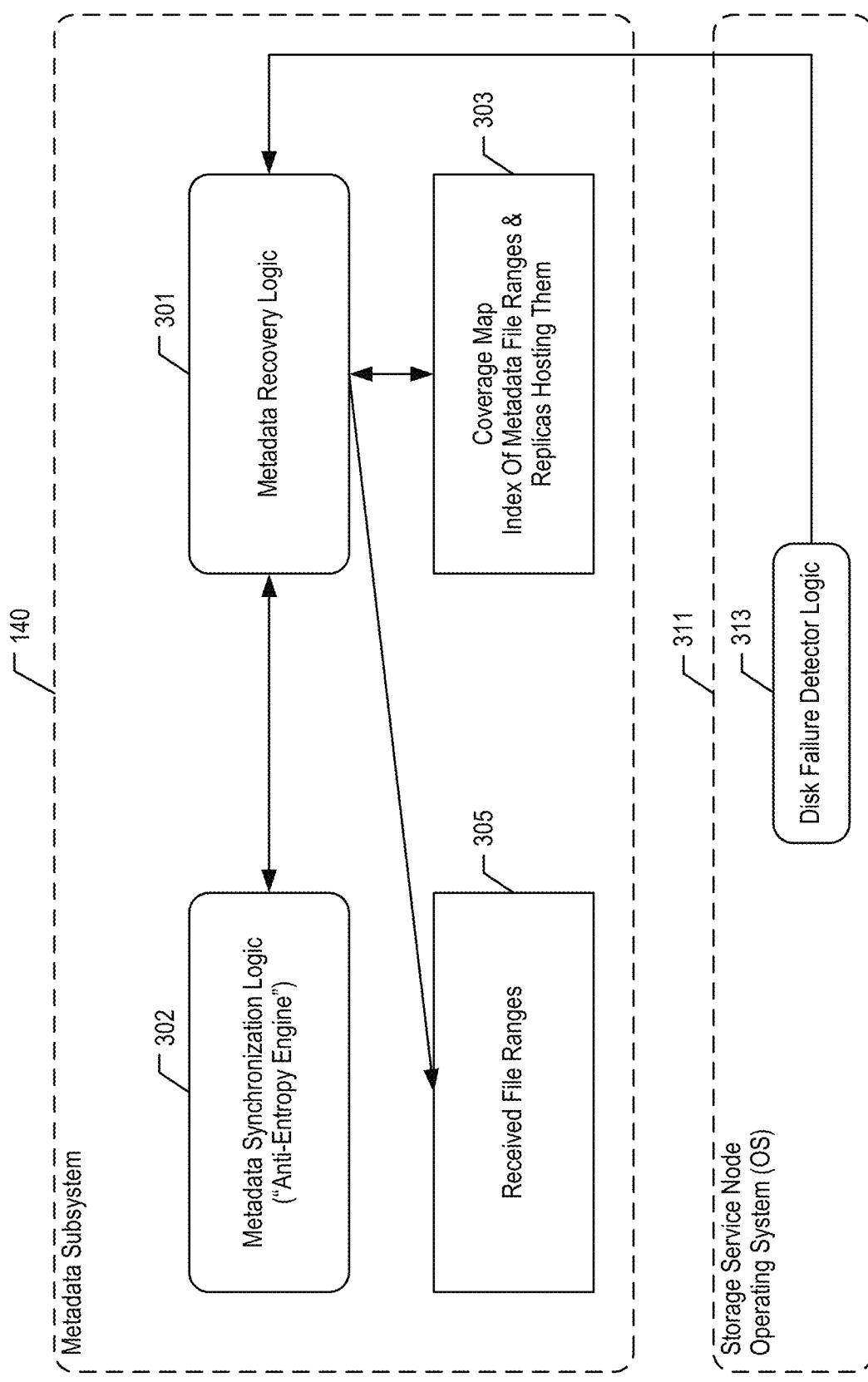
FIG. 3A is a block diagram depicting some components that play a role in the present solution according to an illustrative embodiment.

FIG. 3A is a block diagram depicting some system components that play a role in the present solution according to an illustrative embodiment. The figure depicts: metadata subsystem 140 (or metadata node 140) comprising metadata recovery logic 301, metadata synchronization logic 302, coverage map 303, and received file ranges 305; the operating system 311 of the host storage service node of metadata subsystem 140; and disk failure detector logic 313 executing within operating system 311.

Metadata recovery (or "self-healing") logic 301 is a functional component of metadata subsystem 140, which comprises some of the functionality described herein, including the faildisk( ), unfaildisk( ), and fixdisk( ) processes. More details are given in FIGS. 4A-7.

Metadata synchronization logic 302 (a/k/a the "anti-entropy engine" or "AE") interoperates with metadata recovery logic 301 and helps to obtain missing metadata files from replica metadata nodes. An example of metadata synchronization logic 302 is described in U.S. patent application Ser. No. 15/834,921 filed on Dec. 7, 2017 (now patented as U.S. Pat. No. 10,740,300), which is included in the parent U.S. Provisional App. 63/081,503 filed on Sep. 22, 2020 (matter no. 685.USP1). Metadata synchronization logic 302 compares replicas of metadata and ensures that the replicas agree on a superset of the metadata contained therein without losing any metadata. During storage and compaction of metadata-carrying string-sorted tables (SSTs), a consistent file identification scheme is used across all metadata nodes. Replicas of metadata SSTs are compared and synchronized by comparing their fingerprint files resulting in a faster and more efficient synchronization process. When a client machine writes to and reads from a virtual disk on the distributed data storage system, metadata is generated and stored in replicas on different metadata nodes of the storage system. A modified log-structured merge tree is used to store and compact string-sorted tables (SST) of metadata using a consistent file identification scheme across all metadata nodes. A fingerprint file is created for each metadata SST file that includes a start-length-hash value triple for each region of the metadata SST file. To synchronize, fingerprint files of two SST files are compared, and if any hash values are missing from a fingerprint file then key-value-timestamp triples corresponding to these missing hash values are sent to the SST file that is missing them. Thus, metadata synchronization logic 302 identifies metadata that goes missing from a metadata node when a metadata disk, disks, or partition fails.

Coverage map 303 is an index of metadata file ranges and identifies the metadata node replicas hosting them. Coverage map 303 is generated and maintained by metadata recovery logic 301. As metadata files are received at the present metadata subsystem (e.g., metadata node 140), metadata recovery logic 301 stores them locally as received files 305 and updates coverage map 303. In one embodiment, entries are removed from coverage map 303 after corresponding metadata file ranges 305 are received at metadata node 140. Eventually, when all the metadata file ranges have been received, coverage map 303 will be empty, indicating completion of the present metadata recovery cycle, and the coverage map can be discarded. Other embodiments use a different approach for tracking which metadata files are needed and received at metadata node 140.

Operating system 311 is well known in the art and runs on the host storage service node, e.g., 120. Disk failure detector logic 313 runs in the operating system and is configured to detect disk failures within the storage service node. Disk failure detector logic 313 (e.g., "log watcher" or "log watchdog") is aware of partitions configured on disks of the storage service node and detects partition-level failures and/or whole-disk failures. Disk failure detector logic 313 is also well known in the art. In the present context, disk failure detector logic 313 notifies metadata recovery logic 301 on detecting a disk/partition failure at the host storage service node.

FIG. 3B is a block diagram that depicts an illustrative coverage map 303. The illustrative coverage map includes information identifying replica nodes that carry particular metadata files (which are illustratively organized as column families) and the range values thereof. This depiction is merely illustrative to help the reader's understanding of the present disclosure.

Figure 3C:
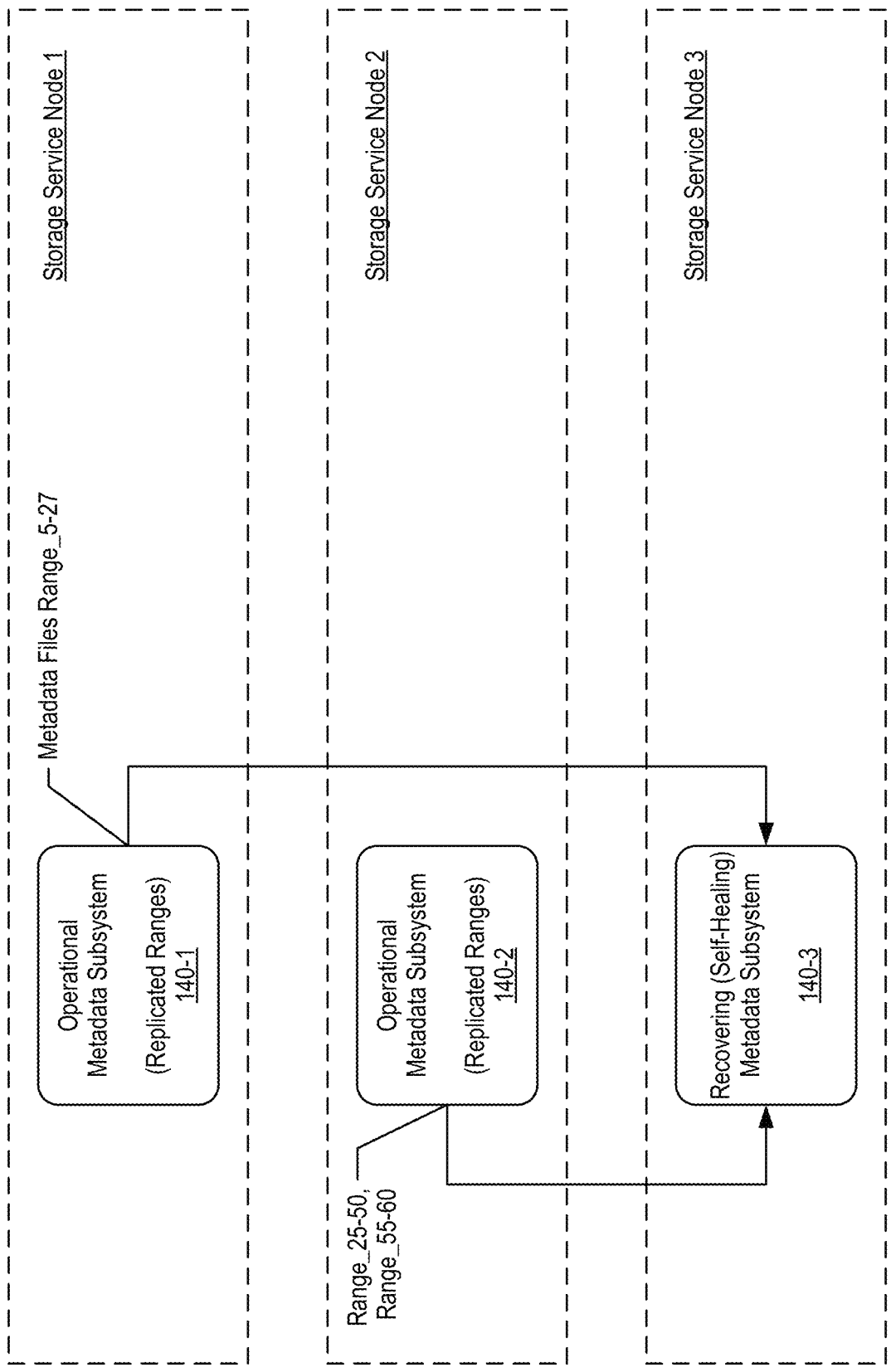
FIG. 3C is a block diagram depicting how the recovering metadata node retrieves lost metadata files from other metadata nodes that comprise replica metadata files according to an illustrative embodiment.

FIG. 3C is a block diagram depicting how the recovering (self-healing) metadata node retrieves lost metadata files from other metadata nodes that comprise replica metadata according to an illustrative embodiment. the figure depicts self-healing granular recovery of lost metadata ranges from replica(s) on other working disks/nodes. Self-healing or recovering metadata subsystem 140-3 obtains replica copies of certain metadata file ranges from replica nodes 140-1 and 140-2, which are located on other storage service nodes on the distributed data storage system. Notably, as to any two replica nodes identified by the recovering node, some of the metadata file ranges may be replicated, but not necessarily so. Thus, the totality of replica metadata of one metadata node may be distributed across many more than three replica nodes in the system, even if any one metadata file is globally replicated only three times according to the illustrative metadata replication factor of three.

Figure 3D:
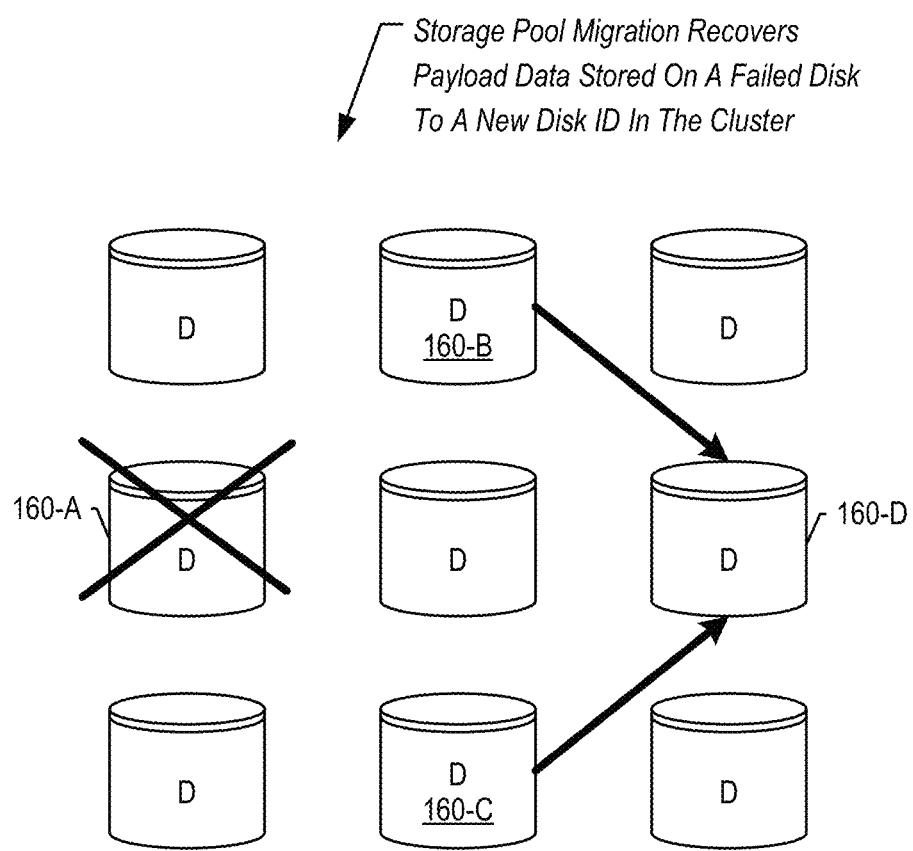
FIG. 3D illustrates how, in the prior art, payload data on data-carrying disks is recovered through storage pool migration to another disk.

FIG. 3D illustrates how, in the prior art, payload data on data-carrying disks is recovered through storage pool migration to another disk. Storage pool migration recovers payload data stored on a failed disk (e.g., 160-A) to another disk (e.g., 160-D) with a new disk ID. The failed disk ID is not retained. As noted earlier, payload data is recovered in this way from ordinary payload-carrying disks (e.g., 160-B, 160-C), but not from payload-data commit-log disks (not shown in this figure). Thus, payload data recovery in the prior art is distinguishable from the present metadata recovery solution, which includes disk ID retention/rehabilitation and metadata commit log recovery, see, e.g., FIG. 3E.

Figure 3E:
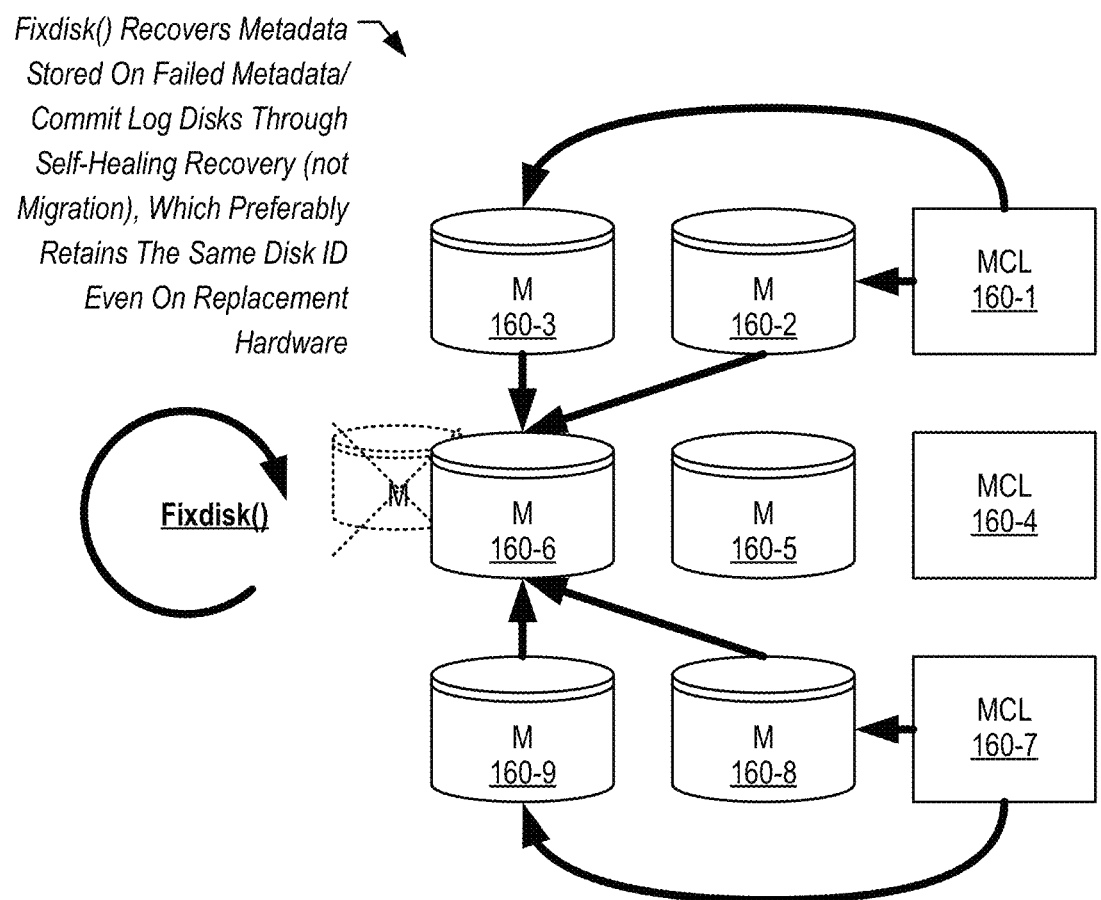
FIG. 3E depicts how fixdisk( ) and the other interoperable processes described herein recover metadata and rehabilitate the failed disk ID according to an illustrative embodiment.

FIG. 3E depicts how fixdisk( ) and the other interoperable processes described herein recover metadata and rehabilitate the failed disk ID according to an illustrative embodiment. To recover metadata in commit logs according to the illustrative embodiments, metadata commit log disks (e.g., 160-1, 160-7) at replica nodes are flushed to ordinary metadata service disks (e.g., 160-3, 160-9, respectively) before metadata file ranges are retrieved therefrom to the replacement metadata disk (e.g., 160-6). The disk ID of the failed disk is preferably retained and rehabilitated in the replacement metadata disk (e.g., 160-6).

Figure 4A:
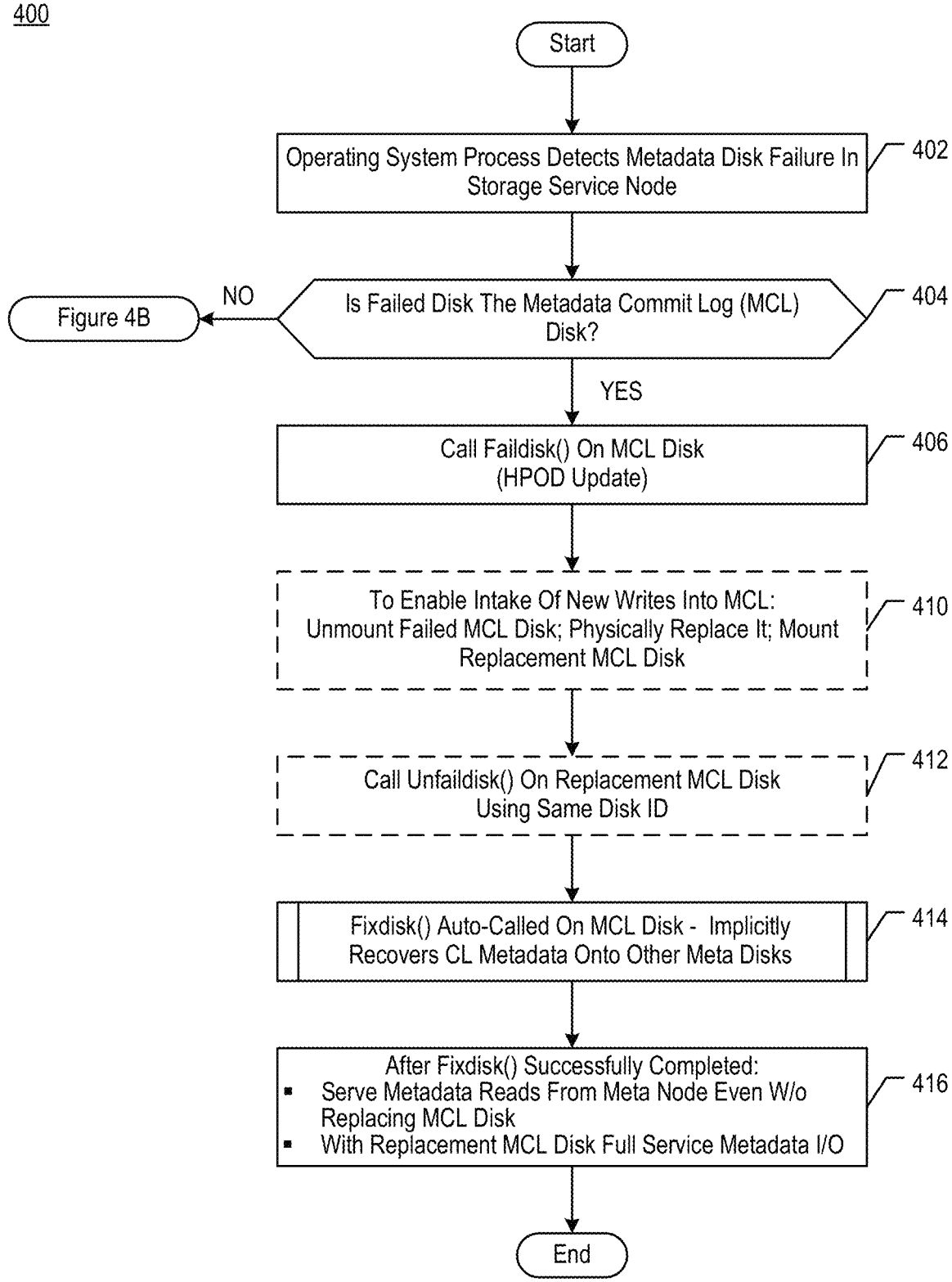
FIG. 4A and FIG. 4B are flow charts depicting some salient operations of a method 400 according to an illustrative embodiment.
Figure 4B:
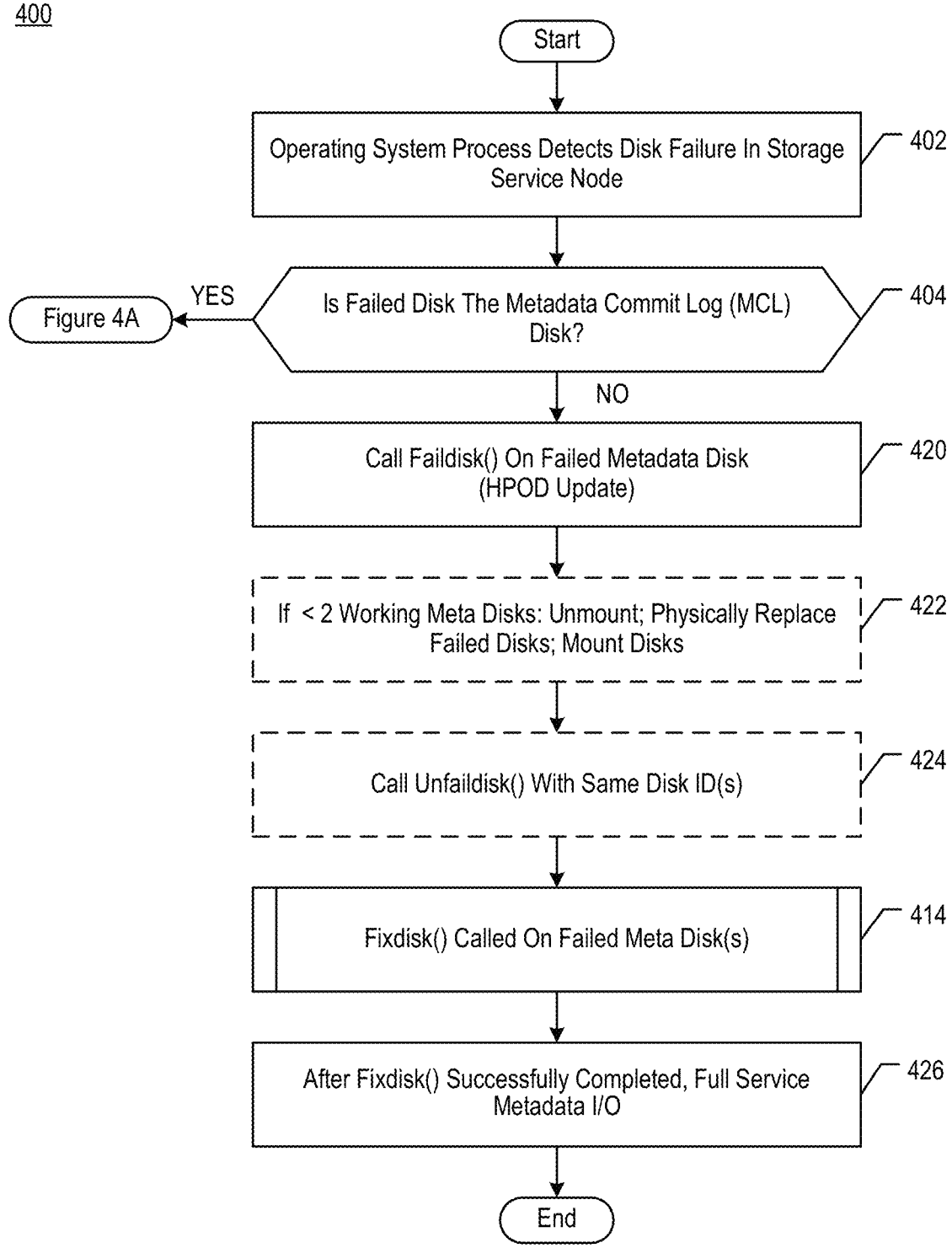

FIG. 4A and FIG. 4B are flow charts depicting some salient operations of a method 400 according to an illustrative embodiment. Method 400 is generally directed to configurations that use a scalable storage cluster 110 such the example shown in FIG. 1B.

FIG. 4A depicts method 400 with respect to a failed metadata commit log (MCL) disk. At block 402, operating system 311 (e.g., using disk failure detector logic 313) detects a failure of a metadata-carrying disk in the storage service node 120. At block 404, method 400 (e.g., metadata subsystem 140) determines whether the failed disk is the metadata commit log (MCL) disk and if so, control passes to block 406; otherwise, method 400 branches off to FIG. 4B when the failed disk is an ordinary metadata service disk (i.e., not a MCL disk). At block 406, method 400 (e.g., metadata subsystem 140) calls faildisk( ) on the MCL disk. Pod subsystem 130 is updated to indicate that the failed disk is taken out of service.

Blocks 410 and 412 are optional. Block 410 is executed to enable intake of new metadata writes into a replacement MCL disk; accordingly the failed MCL disk is unmounted, a replacement MCL disk is physically installed; and the replacement MCL disk is mounted. Following block 410, at block 412 method 400 (e.g., metadata subsystem 140) calls unfaildisk( ) on the replacement MCL disk using the same disk ID. Thus, even though the physical disk is replaced, the disk ID is retained in the system. When the failed MCL disk is replaced with a working disk (i.e., executing blocks 410 and 412), the replacement MCL disk can accept incoming writes and the metadata node once again provides "full service" metadata service. Notably, fixdisk( ) recovers lost commit log metadata from the replica nodes, but such metadata is not restored to the replacement MCL disk and goes to the ordinary metadata disks instead. See also FIG. 3E.

In the event that the failed MCL disk is not physically replaced with a working disk at block 410 (i.e., skipping blocks 410 and 412), method 400 continues with block 414. Here, the fixdisk( ) process can still recover lost metadata (including lost commit log metadata) from replica nodes and can go on to restore read-only metadata service at the metadata node. In other words, according to the illustrative approach, a working MCL disk is not needed for metadata recovery. In such a scenario, because the MCL disk remains failed, the metadata service cannot process incoming write operations, but can serve reads of existing (recovered) metadata.

Figure 6:
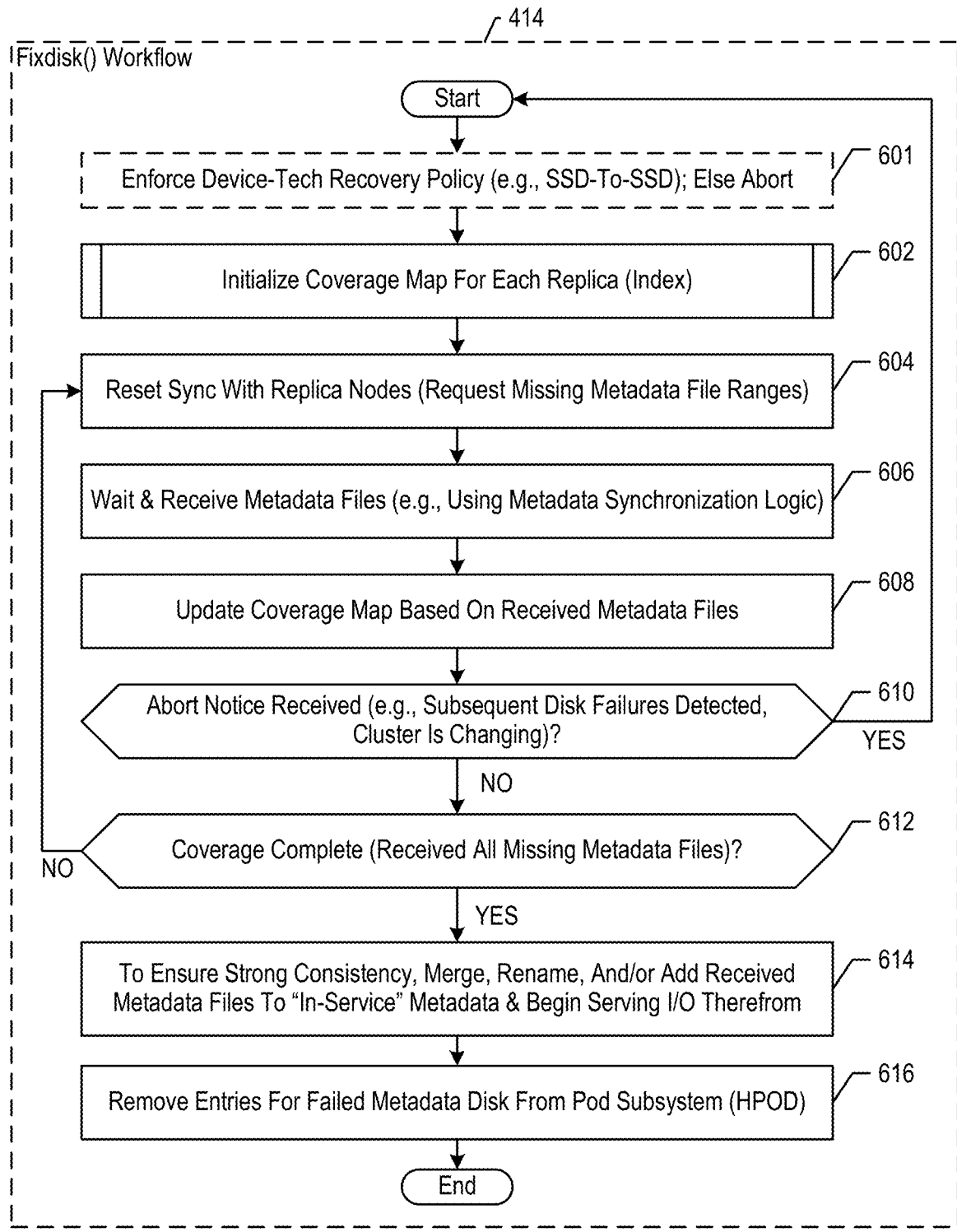
FIG. 6 is a flow chart that depicts some salient operations of a method corresponding to block 414 (e.g., fixdisk( ) process) according to an illustrative embodiment.

More details on the fixdisk( ) process are given in FIG. 6. After the fixdisk( ) process successfully executes and completes its mission in block 414, control passes to block 416. At block 416, the metadata node can serve metadata reads, even without replacing the failed MCL disk (i.e., skipping blocks 410 and 412). Furthermore, with a replacement MCL disk (i.e., performing blocks 410 and 412), the metadata node provides full service metadata I/O and method 400 ends here.

FIG. 4B depicts method 400 with respect to a failed metadata disk that is not an MCL disk. Thus, method 400 branches off to FIG. 4B when the failed disk is an ordinary metadata service disk (i.e., not a MCL disk). Blocks 402, 404, and 414 in FIG. 4B are the same as in FIG. 4A and are shown here for convenience. At block 420, which follows block 404 when method 400 (e.g., metadata subsystem 140) determines that the failed disk is an ordinary metadata service disk and not an MCL disk, method 400 (e.g., metadata subsystem 140) calls faildisk( ) on the failed metadata disk. Pod subsystem 130 is updated to indicate that the failed disk is taken out of service.

Blocks 422 and 424 are optional. Fewer than two working metadata disks cannot meet the resiliency requirements of the metadata node, and in such a scenario, method 400 requires that the failed metadata disks are replaced and activated at blocks 422 and 424. Accordingly, at block 422, the failed metadata disks are unmounted, replacement disks are physically installed; and the replacement disks are mounted. Following block 422, at block 424 method 400 (e.g., metadata subsystem 140) calls unfaildisk( ) on the replacement disks using the same disk IDs as the failed disks. Thus, even though the physical disks are replaced, the disk IDs are retained in the system.

Otherwise, if two or more metadata disks are still in working condition at the metadata node, blocks 422 and 424 can be skipped, and faildisk( ) can still recover lost metadata so that the metadata node can provide metadata service, albeit at the risk of losing another metadata disk. Control passes to block 414 and from there to block 426. At block 426, after the fixdisk( ) process successfully executes and completes its mission in block 414, the replacement metadata node provides full service metadata I/O and method 400 ends here.

Figure 5:
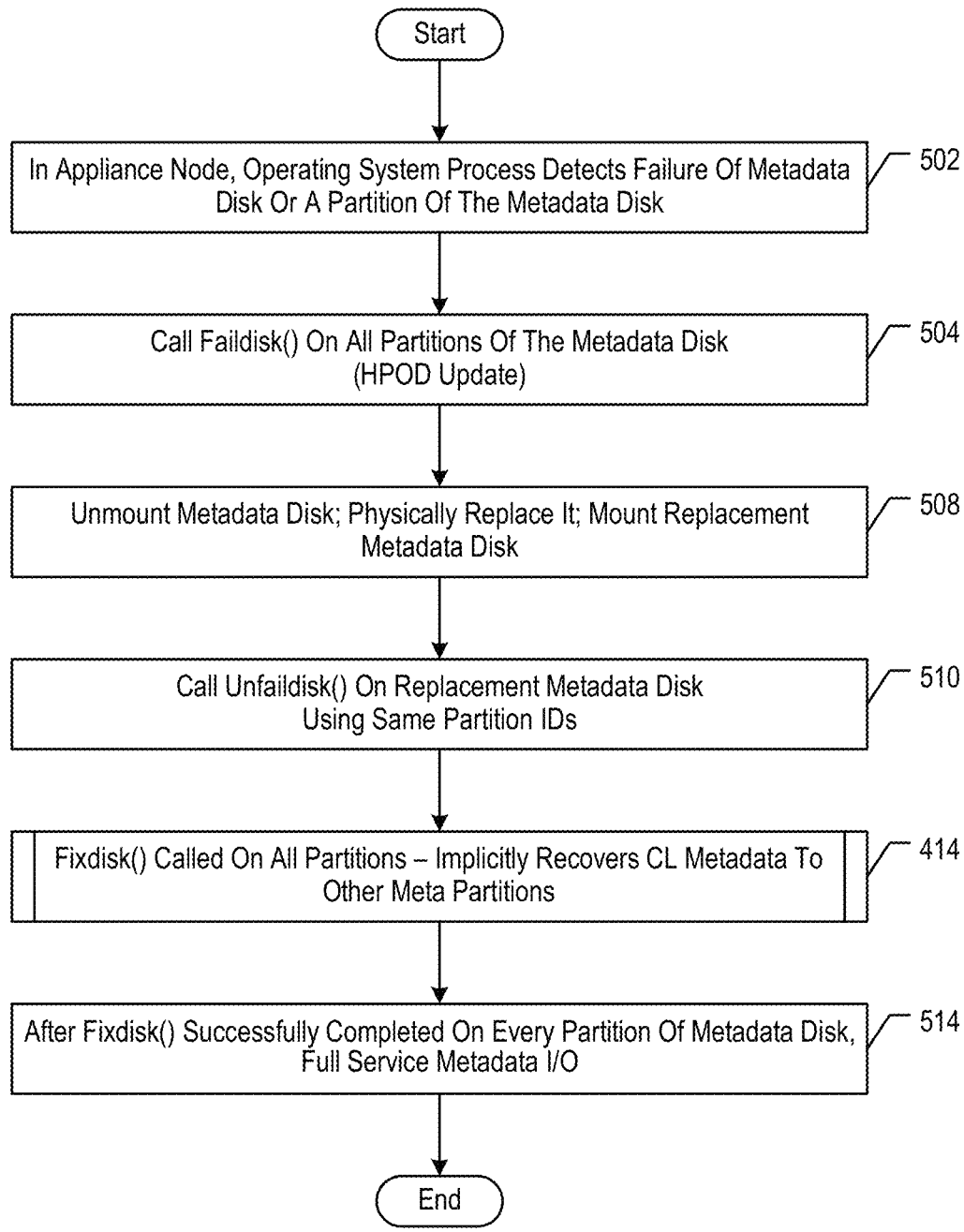
FIG. 5 is a flow chart that depicts some salient operations of a method 500 generally directed to a storage cluster configured in a storage appliance according to an illustrative embodiment.

FIG. 5 is a flow chart that depicts some salient operations of a method 500 generally directed to a storage cluster configured in a storage appliance 210 according to an illustrative embodiment. Because the illustrative appliance 210 places all metadata in a storage service node on a single metadata disk (see, e.g., FIG. 2), such a disk failure is catastrophic to the storage service node and the disk must be replaced, which is not optional, in contrast to the scenarios of FIGS. 4A and 4B. Moreover, a failure detected in any one partition of the metadata disk will cause faildisk( ) to be called on the entire disk, i.e., on all the metadata partitions. After the metadata disk is replaced, fixdisk( ) recovers the lost metadata, including metadata lost from the MCL partition. After fixdisk( ) successfully completes metadata recovery for all the partitions, the metadata disk can once again provide "full service" metadata service at the storage node.

Notably, fixdisk( ) recovers lost commit log metadata from the replica nodes, but such metadata is not restored to the MCL partition and goes to the ordinary metadata partitions instead. See also FIG. 3E.

At block 502, operating system 311 (e.g., using disk failure detector logic 313) detects a failure of a partition of or all of the metadata disk (e.g., 260-3) in storage service node 120. At block 504, method 400 (e.g., using metadata subsystem 140) calls faildisk( ) on all partitions of the metadata disk of appliance 210. Pod subsystem 130 is also updated to indicate that the metadata disk is out of service. At block 508, accordingly the failed disk is unmounted, a replacement disk is physically installed; and the replacement disk is mounted. At block 510, method 400 (e.g., using metadata subsystem 140) calls unfaildisk( ) on the replacement metadata disk and uses the same partition IDs as those in use by the failed disk. Thus, even though the physical disk is replaced, the logical disk IDs (implemented as partition IDs) are retained in the system. Block 414 follows block 510 and is described in more detail in FIG. 6. Following the successful completion of fixdisk( ) in block 414, block 514 follows here. At block 514, after the fixdisk( ) process successfully executes and completes its mission in block 414, the replacement metadata node provides full service metadata I/O in appliance 210 and method 500 ends here.

FIG. 6 is a flow chart that depicts some salient operations of a method of block 414 (e.g., the fixdisk( ) process) according to an illustrative embodiment. Block 414 appears in FIGS. 4A, 4B, and 5 and is described in more detail in the present figure and in FIG. 7. The fixdisk( ) process is executed by the metadata subsystem 140 at the storage service node 120 that experienced the metadata disk failure. When fixdisk( ) takes charge of the recovery and rehabilitation process at the metadata node, it first determines which metadata files are assigned to the failed disk ID by the system-wide metadata partitioning scheme, which employs strong consistency. The present metadata node determines the identity of other metadata nodes that comprise whole or partial replicas of the metadata stored at the present metadata node and/or failed metadata disk. Fixdisk( ) fetches from the replica nodes indexes that indicate which metadata files are stored at those replica nodes. These metadata files carry numerical identifiers in certain ranges, which may be referred to as file ranges. Fixdisk( ) determines which ranges it needs to retrieve from which replica nodes and initiates retrieval calls thereto. It should be noted that fixdisk( ) may determine that it already has some of the needed file ranges and it saves network bandwidth and processing cycles by not requesting these file ranges. Fixdisk( ) maintains a dynamic "coverage map," checking off received files and tracking which file ranges still need to be received from replica nodes. Once the "coverage map" has been exhausted, i.e., all the identified file ranges are stored at the recovering metadata node, fixdisk( ) proceeds to integrate the received metadata files into "in-service" data structures. This may necessitate merging, renaming, and/or adding these files to other existing metadata, if any, on the metadata node. Once the integration step is complete, metadata input/output ("I/O") to/from the disk is now possible. To complete the healing process, fixdisk( ) communicates with the pod synchronization subsystem to remove indications that the metadata disk is out of service. With the out of service indication being removed from the pod synchronization subsystem, fixdisk( ) has successfully completed the metadata recovery and metadata service resumes full operation. Fixdisk( ) will abort if it receives notice that other metadata disks have failed in the storage service node or if the storage cluster is changing (e.g., new nodes are being added). In such a case, fixdisk( ) will try again later after the failed disks have been replaced and/or new nodes have been added, respectively. In some scenarios, fixdisk( ) proceeds to recover metadata even if a failed disk has not been physically replaced. This approach provides a partial solution that enables some metadata services to proceed, albeit in a somewhat degraded fashion.

Block 601 applies only in certain scenarios. At block 601, fixdisk( ) enforces a device-technology recovery policy such as SSD-to-SSD recovery. Thus, fixdisk( ) ensures that metadata lost from a certain kind of storage technology (e.g., SSD) is recovered to the same kind of technology. Because SSD is preferentially used (without limitation) for fast-access storage such as commit logs and certain metadata (e.g., deduplication hash tables, etc.), fixdisk( ) ensures that metadata is recovered to a disk that offers the same kind of fast access as the failed disk. A failure to enforce same-tech or technology-aware recovery would degrade system performance after recovery. Therefore, fixdisk( ) preferably avoids such service degradation by enforcing a device-technology recovery policy for failed metadata-carrying disks. In an embodiment where SSD is used for fast-access storage, such as for metadata commit logs as shown in FIG. 1D, fixdisk( ) checks whether the type of failed disk technology is SSD. Fixdisk( ) checks whether the replacement metadata disk is also SSD and if so, proceeds to block 602. Alternatively, if there is no replacement disk of the appropriate technology (e.g., SSD), but there is another suitable technology (e.g., SSD) disk available for metadata on the storage service node, fixdisk( ) proceeds to block 602, using the new disk ID. Otherwise, if no SSD-to-SSD match is found, fixdisk( ) aborts. Thus, if fixdisk( ) is unable to enforce the device-technology recovery policy at block 601, fixdisk( ) aborts and block 414 ends unsuccessfully here.

At block 602, fixdisk( ) initializes the coverage map (e.g., 303). As noted, this is an index of all the metadata files belonging to the failed metadata disk that need to be recovered from replica nodes. See also FIG. 3B and FIG. 7. At block 604, fixdisk( ) initiates so-called "reset synchronization" operations with the replica nodes and particularly requests certain missing metadata file ranges according to the entries in coverage map 303. This operation saves network bandwidth, because it selectively requests only those metadata file ranges that correspond to the lost metadata. Thus, not every metadata file in the replica is requested "blindly."

Block 606 reflects the fact that the receipt of lost/missing metadata from replica nodes is asynchronous and thus fixdisk( ) may wait at times for the replica nodes to send the requested metadata file ranges and for fixdisk( ) to receive them. Fixdisk( ) stores received metadata file ranges 305 at the recovering metadata node. See, e.g., FIG. 3A. Metadata is received from replicas as (i) full metadata files for ranges that are completely missing at the recovering metadata node, and/or (ii) partial metadata files to fill in what is missing from files ranges that are available at the recovering metadata node. The latter approach is network-bandwidth efficient because it selectively transports only what is needed to fill in gaps and is thus preferred if appropriate. Some of the techniques for identifying metadata gaps, synchronizing metadata across nodes, and filling in missing gaps at the recovering metadata node as performed in block 604 and/or 606 are described in U.S. patent application Ser. No. 15/834, 921 filed on Dec. 7, 2017 (now patented as U.S. Pat. No.

10,740,300) and which is included in parent U.S. Provisional App. 63/081,503 filed on Sep. 22, 2020 (matter no. 685. USP1).

At block 608, fixdisk( ) updates coverage map 303 to reflect receipt of metadata files from replica nodes. At block 610, fixdisk( ) will abort if it receives notice that other metadata disks have failed on the storage service node or of the storage cluster is undergoing change, e.g., new nodes being added, nodes being decommissioned, etc. In such a scenario, fixdisk( ) aborts and will restart again later, e.g., based on a periodicity factor. At block 612, fixdisk( ) determines whether all the requested metadata files have been received and if not, it may re-submit requests at block 604. If all metadata files have been received from the other replica nodes, control passes to block 614. At block 614, fixdisk( ) takes the received metadata files 305, integrates them, and places them "in service" as appropriate. This step is necessary for maintaining the strong consistency of the metadata service in the distributed data storage system. For example, during the integration process, fixdisk( ) may merge the received metadata files with other metadata files; may rename the received/merged metadata files; and/or may add the received metadata files to appropriate metadata storage locations at the metadata node. These integration processing steps make the received metadata suitable for service. Ultimately, all the missing metadata from the failed disk has been recovered and reconstructed. At block 616, fixdisk( ) causes the pod subsystem to remove entries therein that indicate that the disk ID is out of service. Thus, block 616 reverses the out of service indicators entered at blocks 406, 420, and/or 504 (in FIGS. 4A, 4B, and 5, respectively). At this point, the recovered metadata is whole and the metadata service can begin serving I/Os to/from the metadata disks at the present storage service node. As noted above, fixdisk( ) runs periodically and can also be invoked on demand.

Figure 7:
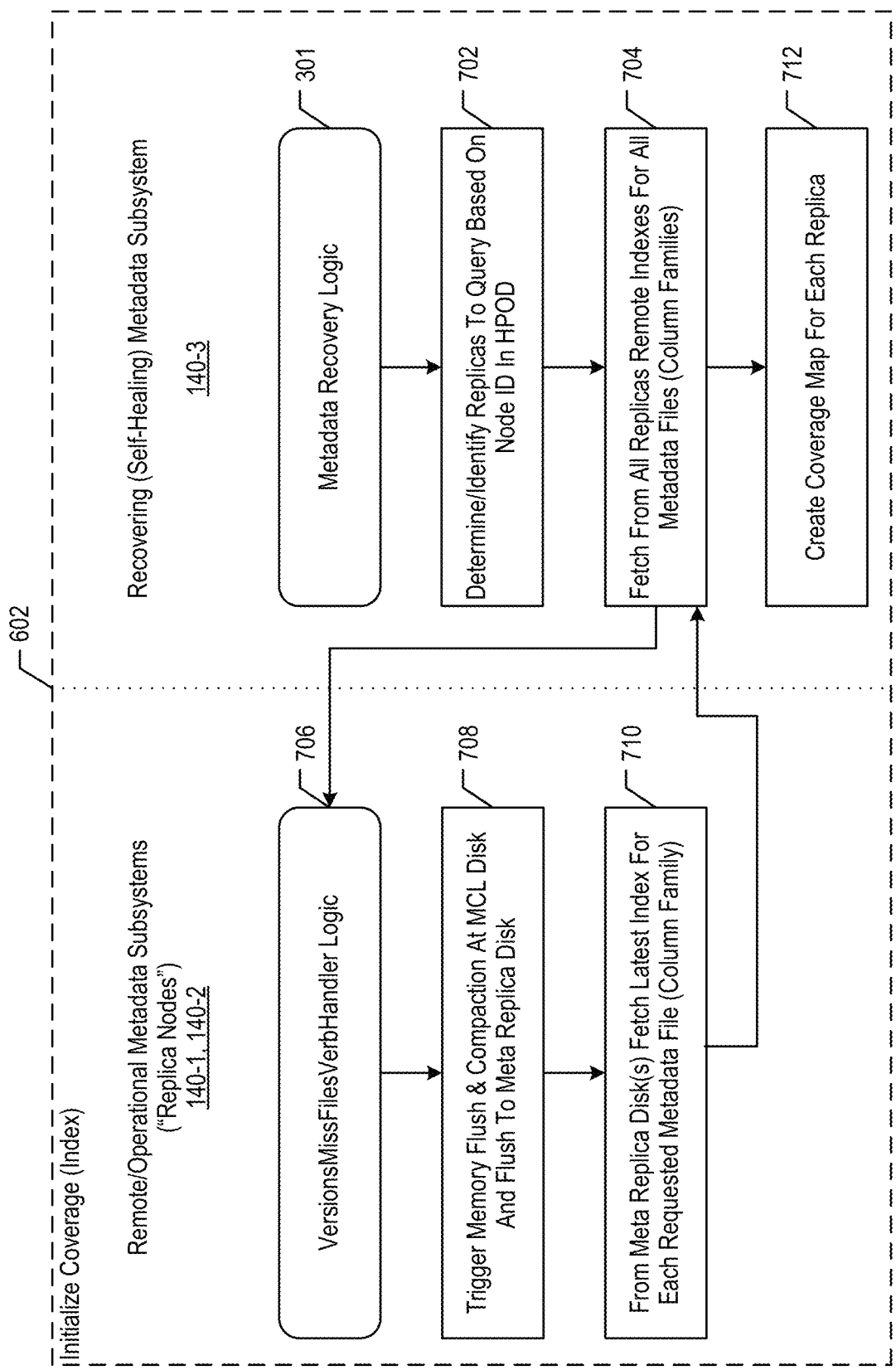
FIG. 7 is a flow chart that depicts certain operations in block 602 of method 414.

FIG. 7 is a flow chart depicted as a fence diagram that depicts certain operations in block 602 of method 414. Block 602 is part of the fixdisk( ) process and is generally directed at initializing coverage map 303. See also FIG. 3B. On the left hand side, replica nodes 140-1 and 140-2 each executes a logic component 706 (e.g., Hedvig "VersionsMissFilesVerbHandler") that responds to requests from the recovering (self-healing) metadata node 140-3. Blocks 708 and 710 are executed by logic 706. On the right hand side, recovering metadata node 140-3 executes metadata recovery logic 301, which includes the fixdisk( ) process.

At block 702, fixdisk( ) determines the identities of the replica nodes to be queried about metadata files. The identities are determined based on the identity of the recovering metadata node 140-3, which is provided by the pod subsystem 130. The metadata node's identity determines which other nodes are replicas (whole or partial) thereof, e.g., 140-1 and 140-2. As noted above in regard to the metadata "ring," each metadata node "owns" one or more regions of the metadata ring, i.e., owns one or more ranges of keys within the ring. The ring is subdivided among the metadata nodes so that any given key is associated with a defined metadata owner and its replica nodes, i.e., each key is associated with a defined set of metadata node replicas. The range(s) of keys associated with each metadata node governs which metadata is stored, maintained, distributed, replicated, and managed by the owner metadata node. At block 704, fixdisk( ) fetches from the identified replicas indexes of metadata files stored at those replicas. This is accomplished by submitting requests for the indexes to logic 706 at the replica nodes.

At block 708, each replica node flushes in-memory metadata corresponding to metadata written on MCL disk to the ordinary metadata disk(s) at the replica node. See also FIG. 3E. This operation is key, because it ensures that metadata residing in commit logs is captured from replica nodes. The capture is indirect, because the MCL disk is flushed to ordinary metadata disks, which supply the missing metadata to the recovering (self-healing) node, and thus there is no direct MCL-to-MCL recovery. This is how fixdisk( ) implicitly recovers metadata from commit logs even when the local MCL disk has failed at the recovering (self-healing) metadata node.

At block 710, logic 706 fetches the latest most up-to-date metadata indexes from the replica node and transmits them to fixdisk( ) at the recovering (self-healing) node. The self-healing or recovering metadata node needs the latest metadata indexes available at that point in time to ensure that all the required metadata is obtained from the replica to ensure strong consistency. Control passes back to block 704.

At block 712, which follows block 704, fixdisk( ) updates coverage map 303 with the index information received from the replica nodes, e.g., 140-1 and 140-2. Ultimately, coverage map 303 will show which replica nodes comprise which metadata file ranges corresponding to the lost metadata at the recovering (self-healing) node. When the coverage map is complete, block 602 ends.

In regard to the figures described herein, other embodiments are possible within the scope of the present invention, such that the above-recited components, steps, blocks, operations, messages, requests, queries, and/or instructions are differently arranged, sequenced, sub-divided, organized, and/or combined. In some embodiments, a different component may initiate or execute a given operation.

Example Embodiments

Some example enumerated embodiments of the present invention are recited in this section in the form of methods, systems, and non-transitory computer-readable media, without limitation.

According to an illustrative embodiment, a distributed data storage system comprises: a plurality of storage service nodes, including a first storage service node comprising at least one first data storage disk that stores metadata, and further including a second storage service node comprising at least one second data storage disk that stores a first replica of the metadata of the first storage service node, and further including a second storage service node comprising at least one third data storage disk that stores a second replica of the metadata of the metadata of the first storage service node; wherein the first storage service is configured to: detect that a first storage disk that stores metadata failed at the first storage service node, cause the first storage disk to be marked as out of service in the distributed data storage system, identify the second storage service node and the third storage service nodes as hosting at least partial replicas of the metadata of the failed first storage disk, retrieve one or more second indexes from the second storage service node indicating which second metadata files are stored therein that comprise replica metadata corresponding to at least some of the metadata of the failed first storage disk, retrieve one or more third indexes from the third storage service node indicating which third metadata files are stored therein that comprise replica metadata corresponding to at least part of the metadata of the failed first storage disk, based on the one or more second indexes and the one or more third indexes, construct a coverage map that identifies storage service nodes among the plurality of storage service nodes that comprise replica metadata corresponding to at least part of the metadata of the failed first storage disk, based on the coverage map, obtain replica metadata corresponding to at least part of the metadata of the failed first storage disk from at least the second storage service node, at a replacement storage disk that physically replaces the failed first storage disk at the first storage service node, integrate the obtained replica metadata into metadata data structures to satisfy in-service designations of metadata files in the distributed data storage system, and serve metadata input/output from the replacement storage disk.

The above-recited embodiment, wherein the out of service indication of the failed first storage disk is removed after the obtained replica metadata is integrated. The above-recited embodiment, wherein metadata service at the first storage service node that serves metadata input/output from the replacement storage disk is not restarted by retaining for the replacement storage disk a system-wide disk identifier assigned to the failed first storage disk. The above-recited embodiment, wherein metadata-carrying commit logs at the second storage service node are flushed to a metadata disk at the second storage service node before replica metadata is obtained therefrom by the first storage service node. The above-recited embodiment, wherein metadata in memory and in commit logs at the second storage service node is included in the replica metadata obtained by the first storage service node from at least the second storage service node. The above-recited embodiment, wherein the obtained replica metadata is synchronized at the first storage service node by an anti-entropy logic executing thereon. The above-recited embodiment, wherein a metadata partitioning scheme at the distributed data storage system uses strong consistency. The above-recited embodiment, wherein the failed first storage disk comprises metadata commit logs. The above-recited embodiment, wherein the failed first storage disk comprises metadata files and not metadata commit logs. The above-recited embodiment, wherein the failed first storage disk comprises metadata files flushed therein from a second storage disk at the first storage service node that comprises commit logs. The above-recited embodiment, wherein the first storage service is further configured to enforce metadata recover to a solid state storage drive if the failed first storage disk is also a solid state storage drive. The above-recited embodiment, wherein metadata service at the first storage service node continues to operate while the first storage disk is out of service. The above-recited embodiment, wherein retaining the disk identifier enables a metadata service at the first storage service node to continue to operate while the first storage disk is out of service. The above-recited embodiment, wherein a metadata service executing at the first storage service node performs the operations. The above-recited embodiment, wherein a pod synchronization service executing at one or more of the first storage service node and another storage service node marks the failed first storage disk as being out of service.

According to another illustrative embodiment, a distributed data storage system comprises: a plurality of storage service nodes, including a first storage service node comprising a first storage resource that stores first metadata, and further including a second storage service node comprising a second storage resource, and further including a third storage service node comprising a third storage resource; wherein the first storage service node is configured to: execute a metadata service, detect that the first storage resource failed, cause the first storage resource to be marked as out of service in the distributed data storage system, identify the second storage service node and the third storage service node as hosting at least partial replicas of the first metadata, retrieve one or more second indexes from the second storage service node indicating which second metadata files are stored therein that comprise replica metadata corresponding to at least some of the first metadata, retrieve one or more third indexes from the third storage service node indicating which third metadata files are stored therein that comprise replica metadata corresponding to at least part of the first metadata, based on the one or more second indexes and the one or more third indexes, construct a coverage map that identifies storage service nodes among the plurality of storage service nodes that comprise replica metadata corresponding to the first metadata, based on the coverage map, obtain replica metadata corresponding to at least part of the first metadata from at least the second storage service node, at a replacement storage resource that physically replaces the first storage resource at the first storage service node, reconstruct the first metadata by integrating the obtained replica metadata into one or more data structures in the replacement storage resource, and without restarting the metadata service at the first storage service node, serve metadata input/output from the replacement storage resource. The above-recited embodiment, wherein the metadata service at the first storage service node that serves the metadata input/output from the replacement storage resource retains for the replacement storage resource a system-wide resource identifier assigned to the first storage resource The above-recited embodiment, wherein retaining the system-wide resource identifier enables the metadata service at the first storage service node to continue to operate while the first storage resource is out of service. The above-recited embodiment, wherein metadata-carrying commit logs at the second storage service node are flushed to a storage resource at the second storage service node before replica metadata is obtained therefrom by the first storage service node. The above-recited embodiment, wherein metadata in memory and in commit logs at the second storage service node is included in the replica metadata obtained by the first storage service node from at least the second storage service node.

The above-recited embodiment, wherein the first storage resource comprises metadata commit logs, including metadata configured in a first commit log, and wherein the metadata that was configured in the first commit log is recovered from the second metadata files into a second storage resource at the first storage service node that is not configured for storing metadata commit logs. The above-recited embodiment, wherein the first storage resource comprises metadata files and not metadata commit logs. The above-recited embodiment, wherein the first storage resource comprises metadata files flushed therein from a second storage resource at the first storage service node that comprises commit logs. The above-recited embodiment, wherein the first storage service node is further configured to enforce metadata recovery to a solid state storage drive if the first storage resource is also a solid state storage drive. The above-recited embodiment, wherein a metadata service at the first storage service node continues to operate while the first storage resource is out of service. The above-recited embodiment, wherein a pod synchronization service executing at one or more of the plurality of storage service nodes marks the first storage resource as being out of service and removes the out of service indication of the first storage resource after the first metadata is reconstructed. The above-recited embodiment, wherein the integrating is performed by an anti-entropy logic executing within the metadata service. The above-recited embodiment, wherein a metadata partitioning scheme at the distributed data storage system uses strong consistency.

According to yet another illustrative embodiment, a method performed at a distributed data storage system implemented on a storage appliance, comprises: by a metadata service that executes on a first storage service node of the storage appliance, wherein the storage appliance comprises a plurality of storage service nodes including a first storage service node comprising a first storage disk that stores first metadata, and further including a second storage service node comprising a second storage disk that stores a first replica of the first metadata, and further including a third storage service node comprising a third storage disk that stores a second replica of the first metadata: detecting that one or more of: the first storage disk and a first partition of the first storage disk has failed; causing a first system-wide first identifier of the first storage disk to be marked as out of service in the distributed data storage system; identifying the second storage service node and the third storage service node as metadata replica nodes of the first storage service node; retrieving second information from the second storage service node indicating that second metadata files are stored therein that comprise replica metadata corresponding to at least some of the first metadata; retrieving third information from the third storage service node indicating that third metadata files are stored therein that comprise replica metadata corresponding to at least part of the first metadata; based on the second information and the third information, obtain the second metadata files from the second storage service node; at a replacement storage disk that physically replaces the first storage disk at the first storage service node, reconstructing the first metadata from at least the second metadata files; causing the first system-wide first identifier of the first storage disk to be associated with the replacement storage disk and to be marked as in service in the distributed data storage system; and serving metadata input/output from the replacement storage disk without restarting the storage appliance. The above-recited embodiment, wherein metadata-carrying commit logs at the second storage service node are flushed to a storage disk at the second storage service node before the second metadata files are obtained therefrom by the first storage service node. The above-recited embodiment, wherein metadata in memory and in commit logs at the second storage service node is included in the second metadata files that are obtained by the first storage service node from the second storage service node. The above-recited embodiment, wherein the first partition of the first storage disk stores metadata-carrying commit logs including metadata configured in a first commit log; and wherein the metadata that was configured in the first commit log is recovered from the second metadata files into a second partition of the replacement storage disk that is not configured for storing metadata commit logs. The above-recited embodiment, wherein a metadata partitioning scheme at the distributed data storage system uses strong consistency. The above-recited embodiment, wherein to reconstruct the first metadata at the replacement storage disk, an anti-entropy logic executing within the metadata service at the first storage service node, integrates the second metadata files into data structures that satisfy in-service designations of metadata files in the distributed data storage system The above-recited embodiment, wherein a pod synchronization service executing at one or more of the plurality of storage service nodes marks the first storage disk as being out of service.

In other embodiments according to the present invention, a system or systems operates according to one or more of the methods and/or computer-readable media recited in the preceding paragraphs. In yet other embodiments, a method or methods operates according to one or more of the systems and/or computer-readable media recited in the preceding paragraphs. In yet more embodiments, a non-transitory computer-readable medium or media causes one or more computing devices having one or more processors and computer-readable memory to operate according to one or more of the systems and/or methods recited in the preceding paragraphs.

Other Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A distributed data storage system comprising:
    a plurality of storage service nodes, including a first storage service node comprising a first storage resource that stores first metadata, and further including a second storage service node comprising a second storage resource, and further including a third storage service node comprising a third storage resource;
    wherein the first storage service node is configured to:
    execute a metadata service,
    detect that the first storage resource failed,
    cause the first storage resource to be marked as out of service in the distributed data storage system,
    identify the second storage service node and the third storage service node as hosting at least partial replicas of the first metadata,
    retrieve one or more second indexes from the second storage service node indicating which second metadata files are stored therein that comprise replica metadata corresponding to at least part of the first metadata,
    retrieve one or more third indexes from the third storage service node indicating which third metadata files are stored therein that comprise replica metadata corresponding to at least part of the first metadata,
    based on the one or more second indexes and the one or more third indexes, construct a coverage map that identifies storage service nodes among the plurality of storage service nodes that comprise replica metadata corresponding to the first metadata,
    based on the coverage map, obtain replica metadata corresponding to at least part of the first metadata from at least the second storage service node,
    at a replacement storage resource that physically replaces the first storage resource at the first storage service node, reconstruct the first metadata by integrating the obtained replica metadata into one or more data structures in the replacement storage resource, and without restarting the metadata service at the first storage service node, serve metadata input/output from the replacement storage resource.

2. The distributed data storage system of claim 1, wherein the metadata service at the first storage service node that serves the metadata input/output from the replacement storage resource retains for the replacement storage resource a system-wide resource identifier assigned to the first storage resource.

3. The distributed data storage system of claim 2, wherein retaining the system-wide resource identifier enables the metadata service at the first storage service node to continue to operate while the first storage resource is out of service.

4. The distributed data storage system of claim 1, wherein metadata-carrying commit logs at the second storage service node are flushed to a storage resource at the second storage service node before replica metadata is obtained therefrom by the first storage service node.

5. The distributed data storage system of claim 1, wherein metadata in memory and in commit logs at the second storage service node is included in the replica metadata obtained by the first storage service node from at least the second storage service node.

6. The distributed data storage system of claim 1, wherein the first storage resource comprises metadata commit logs, including metadata configured in a first commit log, and wherein the metadata that was configured in the first commit log is recovered from the second metadata files into a second storage resource at the first storage service node that is not configured for storing metadata commit logs.

7. The distributed data storage system of claim 1, wherein the first storage resource comprises metadata files and not metadata commit logs.

8. The distributed data storage system of claim 1, wherein the first storage resource comprises metadata files flushed therein from a second storage resource at the first storage service node that comprises commit logs.

9. The distributed data storage system of claim 1, wherein the first storage service node is further configured to enforce metadata recovery to a solid state storage drive if the first storage resource is also a solid state storage drive.

10. The distributed data storage system of claim 1, wherein the metadata service at the first storage service node continues to operate while the first storage resource is out of service.

11. The distributed data storage system of claim 1, wherein a pod synchronization service executing at one or more of the plurality of storage service nodes marks the first storage resource as being out of service and removes an out of service indication of the first storage resource after the first metadata is reconstructed.

12. The distributed data storage system of claim 1, wherein the integrating is performed by an anti-entropy logic executing within the metadata service.

13. The distributed data storage system of claim 1, wherein a metadata partitioning scheme at the distributed data storage system uses strong consistency.

14. A method performed at a distributed data storage system implemented on a storage appliance, the method comprising:

by a metadata service that executes on a first storage service node of the storage appliance, wherein the storage appliance comprises a plurality of storage service nodes including a first storage service node comprising a first storage disk that stores first metadata, and further including a second storage service node comprising a second storage disk that stores a first replica of the first metadata, and further including a third storage service node comprising a third storage disk that stores a second replica of the first metadata:

detecting that one or more of: the first storage disk and a first partition of the first storage disk has failed;

causing a first system-wide first identifier of the first storage disk to be marked as out of service in the distributed data storage system;

identifying the second storage service node and the third storage service node as metadata replica nodes of the first storage service node;

retrieving second information from the second storage service node indicating that second metadata files are stored therein that comprise replica metadata corresponding to at least part of the first metadata;

retrieving third information from the third storage service node indicating that third metadata files are stored therein that comprise replica metadata corresponding to at least part of the first metadata;

based on the second information and the third information, obtain the second metadata files from the second storage service node;

at a replacement storage disk that physically replaces the first storage disk at the first storage service node, reconstructing the first metadata from at least the second metadata files;

causing the first system-wide first identifier of the first storage disk to be associated with the replacement storage disk and to be marked as in service in the distributed data storage system; and serving metadata input/output from the replacement storage disk without restarting the storage appliance.

15. The method of claim 14, wherein metadata-carrying commit logs at the second storage service node are flushed to a storage disk at the second storage service node before the second metadata files are obtained therefrom by the first storage service node.

16. The method of claim 14, wherein metadata in memory and in commit logs at the second storage service node is included in the second metadata files that are obtained by the first storage service node from the second storage service node.

17. The method of claim 14, wherein the first partition of the first storage disk stores metadata-carrying commit logs including metadata configured in a first commit log; and wherein the metadata that was configured in the first commit log is recovered from the second metadata files into a second partition of the replacement storage disk that is not configured for storing metadata commit logs.

18. The method of claim 14, wherein a metadata partitioning scheme at the distributed data storage system uses strong consistency.

19. The method of claim 14, wherein to reconstruct the first metadata at the replacement storage disk, an anti-entropy logic executing within the metadata service at the first storage service node, integrates the second metadata files into data structures that satisfy in-service designations of metadata files in the distributed data storage system.

20. The method of claim 14, wherein a pod synchronization service executing at one or more of the plurality of storage service nodes marks the first storage disk as being out of service.

* * * * *